United States Patent
Wyville et al.

(10) Patent No.: US 11,849,474 B2
(45) Date of Patent: Dec. 19, 2023

(54) METHODS FOR MODELING INTERMODULATION DISTORTION (IMD) PRESENT IN RECEIVED SIGNALS

(71) Applicant: Telefonaktiebolaget LM Ericsson (publ), Stockholm (SE)

(72) Inventors: Mark Wyville, Ottawa (CA); Bilel Fehri, Ottawa (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 353 days.

(21) Appl. No.: 17/438,595

(22) PCT Filed: Mar. 28, 2019

(86) PCT No.: PCT/IB2019/052568
§ 371 (c)(1),
(2) Date: Sep. 13, 2021

(87) PCT Pub. No.: WO2020/194038
PCT Pub. Date: Oct. 1, 2020

(65) Prior Publication Data
US 2022/0150901 A1    May 12, 2022

(51) Int. Cl.
*H04W 72/08*    (2009.01)
*H04W 72/12*    (2023.01)
(Continued)

(52) U.S. Cl.
CPC ...... *H04W 72/541* (2023.01); *H04B 17/3913* (2015.01); *H04W 72/0446* (2013.01)

(58) Field of Classification Search
None
See application file for complete search history.

(56) References Cited

U.S. PATENT DOCUMENTS

| | | | |
|---|---|---|---|
| 2010/0056131 A1* | 3/2010 | Kelif | H04W 72/542 455/422.1 |
| 2011/0164604 A1* | 7/2011 | Hao | H04L 27/2626 375/295 |

(Continued)

OTHER PUBLICATIONS

International Search Report and Written Opinion dated Dec. 13, 2019 for International Application No. PCT/IB2019/052568 filed Mar. 28, 2019, consisting of 11—pages.

(Continued)

*Primary Examiner* — Sai Aung
(74) *Attorney, Agent, or Firm* — Christopher & Weisberg, P.A.

(57) ABSTRACT

Embodiments include methods for determining intermodulation distortion (IMD) present in an uplink channel received by a network node in a wireless communication network. Such embodiments include, for each of a plurality of time period pairs comprising first and second time periods: measuring a first parameter for an uplink channel received and a second parameter for each of a plurality of downlink channels transmitted by the network node; and for the uplink channel, determining a first difference between the first parameter measured during the first time period and the first parameter measured during the second time period. Such embodiments also include, based on the first difference and the second parameters, determining a predictive model for an IMD signal, associated with the downlink channels, that can be received by the network node in the uplink channel. For example, the predictive model can be used to adjust transmitter settings to improve IMD performance.

20 Claims, 10 Drawing Sheets

(51) Int. Cl.
*H04W 52/14* (2009.01)
*H04W 72/541* (2023.01)
*H04B 17/391* (2015.01)
*H04W 72/0446* (2023.01)

(56) References Cited

U.S. PATENT DOCUMENTS

| | | | |
|---|---|---|---|
| 2012/0120821 A1* | 5/2012 | Kazmi | H04W 56/0045 370/336 |
| 2012/0120944 A1* | 5/2012 | Yang | H04L 7/04 370/350 |
| 2013/0194984 A1 | 8/2013 | Cheng et al. | |
| 2014/0269480 A1* | 9/2014 | Han | H04W 52/0216 370/311 |
| 2016/0374096 A1 | 12/2016 | Lindoff et al. | |
| 2017/0142694 A1* | 5/2017 | Yerramalli | H04L 5/0091 |
| 2017/0202054 A1* | 7/2017 | Rathonyi | H04W 72/23 |
| 2020/0169435 A1* | 5/2020 | Kang | H04L 25/0226 |
| 2020/0404629 A1* | 12/2020 | Wang | H04W 72/0446 |

OTHER PUBLICATIONS

3GPP TS 38.211 V15.3.0; 3rd Generation Partnership Project; Technical Specification Group Radio Access Network; NR; Physical channels modulation (Release 15); Sep. 2018, consisting of 96—pages.

* cited by examiner

METHODS FOR MODELING INTERMODULATION DISTORTION (IMD) PRESENT IN RECEIVED SIGNALS

CROSS-REFERENCE TO RELATED APPLICATIONS

This application is a Submission Under 35 U.S.C. § 371 for U.S. National Stage Patent Application of International Application Number: PCT/IB2019/052568, filed Mar. 28, 2019 entitled "METHODS FOR MODELING INTERMODULATION DISTORTION (IMD) PRESENT IN RECEIVED SIGNALS," the entirety of which is incorporated herein by reference.

TECHNICAL FIELD

Embodiments of the present disclosure generally relates to wireless communication networks, and particularly relates to mitigating the effects of intermodulation distortion (IMD) in a transmitted signal on the signal quality of a received signal, e.g., in a wireless base station.

BACKGROUND

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-("3G") and second-generation ("2G") 3GPP radio access networks are commonly known. As shown in FIG. 1, UE 120 communicates wirelessly with eNB 115, with the LTE UE-eNB interface commonly referred to as the "Uu" interface.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Procotol (IP) data packets (e.g., data or user plane) between the UE and the EPC, and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)-labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

The LTE control plane (C-plane) protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the C-plane, which carries control information, and the user plane (U-plane), which is carries user data. The PDCP layer provides ciphering/deciphering and integrity protection for both U-plane and C-plane, as well as other functions for the U-plane such as header compression.

The PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation, and demodulation of physical channels; transmit diversity, beamforming, and multiple input multiple output (MIMO) antenna processing; and sending radio measurements to higher layers (e.g., RRC).

Generally speaking, a physical channel corresponds a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel. PUSCH is the uplink counterpart to the PDSCH. PUCCH is used by UEs to transmit uplink control information, including HARQ acknowledgements, channel state information reports, etc. PRACH is used for random access preamble transmission.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 2A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 2A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}RB$ PRB pairs, each of which comprises $2N^{DL}_{symb} \cdot N^{RB}_{sc}$ REs. For a normal CP and 15-KHz SCS, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB}=n_{VRB}$. On the other hand, distributed VRBs may be mapped to non-consecutive PRBs according to various rules, as described in 3GPP Technical Specification (TS) 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

FIG. 2B shows an exemplary LTE FDD uplink (UL) radio frame configured in a similar manner as the exemplary FDD DL radio frame shown in FIG. 2A. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the resources shown in FIGS. 2A and 2B, respectively. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for eNB DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

The REGs comprising the CCEs of the PDCCH can be mapped into the first three symbols of a subframe, referred to as a "control region," whereas the remaining symbols are available for other physical channels, such as the PDSCH which carries user data. Each of the REGs comprises four REs. The number of CCEs may vary depending on the required PDCCH capacity, which can be determined based on number of users, amount of measurements and/or control signaling, etc. On the uplink, PUCCH can be configured similarly.

Within the LTE DL, certain REs within each LTE subframe are reserved for the transmission of reference signals, such as DM-RS mentioned above. For example, DM-RS can be carried in OFDM symbols in the sixth, seventh, thirteenth, and fourteenth symbols of the OFDM subframe, with the respective DM-RS REs distributed in the frequency domain within each of the symbols. In addition, the DM-RS REs are divided into two code division multiplexing (CDM) groups referred to as CDM Groups 1 and 2. In LTE systems supporting transmission ranks 1-4, both CDM groups are used in combination with length-2 orthogonal cover codes OCCs. The OCCs are applied to clusters of two adjacent (i.e., in time domain) reference symbols in the same sub-carrier in the frequency domain.

In LTE, DL transmissions are dynamically scheduled, i.e., in each subframe the base station transmits control information indicating the terminal to which data is transmitted and upon which resource blocks the data is transmitted, in the current downlink subframe. This control signaling is typically transmitted in the first n OFDM symbols in each subframe and the number n (=1, 2, 3 or 4) is known as the Control Format Indicator (CFI) indicated by the PCFICH transmitted in the first symbol of the control region.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher. In contrast, URLLC requires low latency and high reliability but with less strict data rate requirements.

FIG. 3 shows a high-level view of an exemplary 5G network architecture, including a Next Generation Radio Access Network (NG-RAN) 399 and a 5G Core (5GC) 398. As shown in the figure, NG-RAN 399 can include gNBs 310 (e.g., 310a,b) and ng-eNBs 320 (e.g., 320a,b) that are interconnected with each other via respective Xn interfaces. The gNBs and ng-eNBs are also connected via the NG interfaces to 5GC 398, more specifically to the AMF (Access and Mobility Management Function) 330 (e.g., AMFs 330a,b) via respective NG-C interfaces and to the UPF (User Plane Function) 340 (e.g., UPFs 340a,b) via respective NG-U interfaces.

Each of the gNBs 310 can support the NR radio interface, including frequency division duplexing (FDD), time division duplexing (TDD), or a combination thereof. In contrast, each of ng-eNBs 320 supports the LTE radio interface but, unlike conventional LTE eNBs (such as shown in FIG. 1), connect to the 5GC via the NG interface.

Similar to LTE, NR uses CP-OFDM (Cyclic Prefix Orthogonal Frequency Division Multiplexing) in the DL and both CP-OFDM and DFT-spread OFDM (DFT-S-OFDM) in the UL. In the time domain, NR downlink and uplink physical resources are organized into equally-sized subframes of 1-ms each. A subframe is further divided into multiple slots of equal duration, with each slot including multiple OFDM-based symbols.

In Rel-15 NR, a UE can be configured with up to four carrier bandwidth parts (BWPs) in the downlink with a single downlink carrier BWP being active at a given time. A UE can be configured with up to four carrier BWPs in the uplink with a single uplink carrier BWP being active at a given time. If a UE is configured with a supplementary uplink, the UE can be configured with up to four additional carrier BWPs in the supplementary uplink, with a single supplementary uplink carrier BWP being active at a given time.

FIG. 4 shows an exemplary time-frequency resource grid for an NR slot. As illustrated in FIG. 4, a resource block (RB) consists of a group of 12 contiguous OFDM subcarriers for a duration of a 14-symbol slot. Like in LTE, a resource element (RE) consists of one subcarrier in one slot. Common RBs (CRBs) are numbered from 0 to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at a given point in time.

Within a BWP, RBs are defined and numbered in the frequency domain from 0 to $N_{BWPi}^{size}-1$ where i is the index of the particular BWP for the carrier. Similar to LTE, each NR resource element (RE) corresponds to one OFDM subcarrier during one OFDM symbol interval. Various SCS values (referred to as numerologies) are supported in NR and are given by $\Delta f=(15\times 2^\alpha)$ kHz where $\alpha \in (0, 1, 2, 3, 4)$. The basic (or reference) subcarrier spacing of $\Delta f=15$ kHz is also used in LTE. The slot length is inversely related to subcarrier spacing or numerology according to $\frac{1}{2}^\alpha$ ms. For example, there is one (1-ms) slot per subframe for $\Delta f=15$ kHz, two 0.5-ms slots per subframe for $\Delta f=30$ kHz, etc. In addition, the RB bandwidth is directly related to numerology according to $2^\alpha *180$ kHz.

Table 1 below summarizes the supported NR transmission numerologies and associated parameters. Different DL and UL numerologies can be configured by the network.

TABLE 1

| μ | $\Delta f = 2^\mu \cdot 15$ [kHz] | Cyclic prefix | Slot length | RB BW (MHz) |
|---|---|---|---|---|
| 0 | 15 | Normal | 1 ms | 0.18 |
| 1 | 30 | Normal | 0.5 ms | 0.36 |
| 2 | 60 | Normal, Extended | 0.25 ms | 0.72 |
| 3 | 120 | Normal | 125 μs | 1.44 |
| 4 | 240 | Normal | 62.5 μs | 2.88 |

An NR slot can include 7 or 14 symbols for $\Delta f \leq 60$ kHz, and 14 symbols for $\Delta f > 60$ kHz. In addition, NR includes Type-B scheduling, also known as "mini-slots." These are shorter than slots, typically ranging from one symbol up to one less than the number of symbols in a slot (e.g., 6 or 13), and can start at any symbol of a slot. Mini-slots can be used if the transmission duration of a slot is too long and/or the occurrence of the next slot start is too late. Applications of mini-slots include unlicensed spectrum and latency-critical transmission (e.g., URLLC). However, mini-slots are not service-specific and can also be used for eMBB or other services.

Within an NR slot, the PDCCH channels can be confined to a particular number of symbols and a particular number of subcarriers, where this region is referred to as the control resource set (CORESET). A CORESET is made up of multiple RBs (i.e., multiples of 12 REs) in the frequency domain and either one, two, or three OFDM symbols in the time domain, as further defined in 3GPP TS 38.211 § 7.3.2.2. A CORESET is functionally similar to the LTE control region. One difference, however, is that in NR, each REG consists of the 12 REs of one OFDM symbol in a RB, whereas an LTE REG includes only four REs, as discussed above.

Like in LTE, the CORESET time domain size can be indicated by PCFICH. In LTE, the frequency bandwidth of the control region is fixed (i.e., to the total system bandwidth), whereas in NR, the frequency bandwidth of the CORESET is variable. CORESET resources can be indicated to a UE by RRC signaling.

In both LTE and NR networks, each base station (e.g., eNBs, gNBs, ng-eNBs, en-gNBs) can transmit multiple DL carriers, with each carrier covering a different frequency bandwidth (e.g., different center frequencies and generally non-overlapping ranges). For example, in NR networks, a gNB can transmit multiple CP-OFDM DL carriers, with each DL carrier being configured with a particular numerology selected from the ones shown in Table 1 above. During transmission, the various DL carriers can be amplified in multiple amplifier stages, with a final-stage power amplifier (or "PA" for short) generating the high-powered signal provided to the base station's transmit antennas.

The energy required by the PA to generate the high-powered, multi-carrier DL signal can be a substantial portion of the overall base station energy budget. Accordingly, PA operational efficiency is very important. One way to increase efficiency is operating the PA as close as possible to saturation, which is the point where an increase in input signal level will not produce a corresponding increase in output signal level. One drawback of this approach, however, is that the PA becomes more non-linear as it approaches saturation. Such non-linearities typically cause interactions among the multiple carriers, resulting in intermodulation distortion (IMD) in the PA output signal. On the other hand, operating the PA "backed off" from saturation in a linear region reduces the operational efficiency, causing the PA to require more input energy (e.g., from a power supply) to produce the same output signal.

Accordingly, there is a fundamental tradeoff between operational efficiency and non-linearity, and some amount of non-linearity must be tolerated in the interest of efficiency. As such, the base station PA output signal will include some amount of IMD caused by the non-linear effects on the multiple carriers. This resulting IMD can occur at frequencies outside of the frequency bandwidths of the DL carriers, including within frequency bandwidths of UL signals received by the base station. For example, IMD from the DL carriers can occur within the frequency bandwidth of an UL carrier, e.g., carrying signals and/or channels transmitted by one or more UEs. Such IMD can degrade, reduce, and/or inhibit the base station's ability to receive the signals and/or channels carried by the affected UL carrier. More simply put, in such scenarios, the base station transmitter's non-linearities are generating IMD interference with its own receiver.

Various conventional techniques have been proposed for mitigating IMD itself and/or its effects on a received signal. However, these conventional techniques suffer from one or more problems, issues, and/or drawbacks such as excessive implementation and/or computational complexity, inadequate sensitivity to detect IMD, excessive sensitivity to UE signals and/or channels in the UL signal, etc. Accordingly, there is a need for an improved technique for modelling IMD caused by various non-linearities that can reduce and/or mitigate the effects of IMD on a received signal, e.g., in a wireless base station.

SUMMARY

Embodiments of the present disclosure provide specific improvements to communication between user equipment (UE) and network nodes in a wireless communication network, such as by facilitating solutions to overcome the exemplary problems described above.

Some exemplary embodiments of the present disclosure include methods and/or procedures for determining intermodulation distortion (IMD) present in an uplink (UL) channel received by a network node in a wireless communication network, according to various exemplary embodiments of the present disclosure. The exemplary method and/or procedure can be performed by a network node (e.g., base station, eNB, gNB, en-gNB, ng-eNB, etc., or component thereof) in a wireless communication network, such as a radio access network (RAN).

The exemplary method and/or procedure can include performing various operations with respect to each of a plurality of time-period pairs. Each time-period pair can include a first time period and a second time period. For example, the first and second time periods can be the durations of two OFDM symbols in a subframe of a radio frame, such as described above in relation to other figures. In some embodiments, the first and second time periods comprising each time-period pair can be consecutive, e.g., without any substantial intervening time period. In some embodiments, the first and second time periods can be consecutive symbols in one slot.

The various operations performed with respect to each of the time-period pairs can include, for each of the first and second time periods, measuring a first parameter for an UL channel received by the network node during that particular time period. The UL channel can include one or more carriers. For example, the measured first parameter can be average received (UL) power during the respective time periods (e.g., during two successive OFDM symbols).

The various operations performed with respect to each of the time-period pairs can also include, for each of the first and second time periods, measuring a second parameter for each of a plurality of second downlink (DL) channels transmitted by the network node during that particular time period. For example, average transmitted power can be measured for each of a plurality of DL channels during the respective time periods (e.g., during two successive OFDM symbols). Each of the DL channels can include one or more carriers. The plurality of second DL channels can be selected in various ways. For example, the plurality of second DL channels can be all DL channels that are in the same conducted transmission line, all DL channels that are amplified by the same power amplifier, and/or all DL channels that can be received by an antenna together with the UL channel.

The various operations performed with respect to each of the time-period pairs can also include determining, for the UL channel, a measured first difference between the first parameter measured during the first time period and the first parameter measured during the second time period. For example, the measured first difference can be between average UL power measured on two successive OFDM symbols, which can denoted as $\Delta P_{UL}$.

The exemplary method and/or procedure can also include determining a predictive model for an IMD signal, associated with the second DL channels, that can be received by the network node in the UL channel. This determination can be based on the measured first difference and the measured second parameters for the respective time-period pairs. For example, the predictive model can be a non-linear model relating the first parameter and the second parameters.

In some embodiments, the predictive model can be for an IMD signal, associated with the second DL channels, that is transmitted by the network node into a wireless transmission medium, and that can be received by the network node via an antenna. In other embodiments, the predictive model can be for an IMD signal, associated with the second DL channels, that is transmitted by the network node into a wired transmission medium, and that can be received by the network node via the wired transmission medium. For example, the wired transmission medium can be a cable.

Other exemplary embodiments include network nodes (e.g., base stations, eNBs, gNBs, ng-eNBs, en-gNBs, etc. or components thereof) or distortion modeling circuits configured to perform operations corresponding to various ones of the exemplary methods and/or procedures described above. Other exemplary embodiments include non-transitory, computer-readable media storing program instructions that, when executed by at least one processor, configure such network nodes or such UEs to perform operations corresponding to the exemplary methods and/or procedures described above. Other exemplary embodiments include computer-program products comprising such instructions.

These and other objects, features and advantages of the exemplary embodiments of the present disclosure will become apparent upon reading the following detailed description of the exemplary embodiments of the present disclosure.

BRIEF DESCRIPTION OF THE DRAWINGS

FIG. 9, which includes

DETAILED DESCRIPTION

As mentioned above, various conventional techniques have been proposed for mitigating transmitter intermodulation distortion (IMD) and/or its effects on receiver performance. However, these conventional techniques suffer from one or more problems, issues, and/or drawbacks such as excessive implementation and/or computational complexity, inadequate sensitivity to detect IMD, excessive sensitivity to UE signals and/or channels in the UL signal, etc. This is discussed in more detail below.

Figure 5:
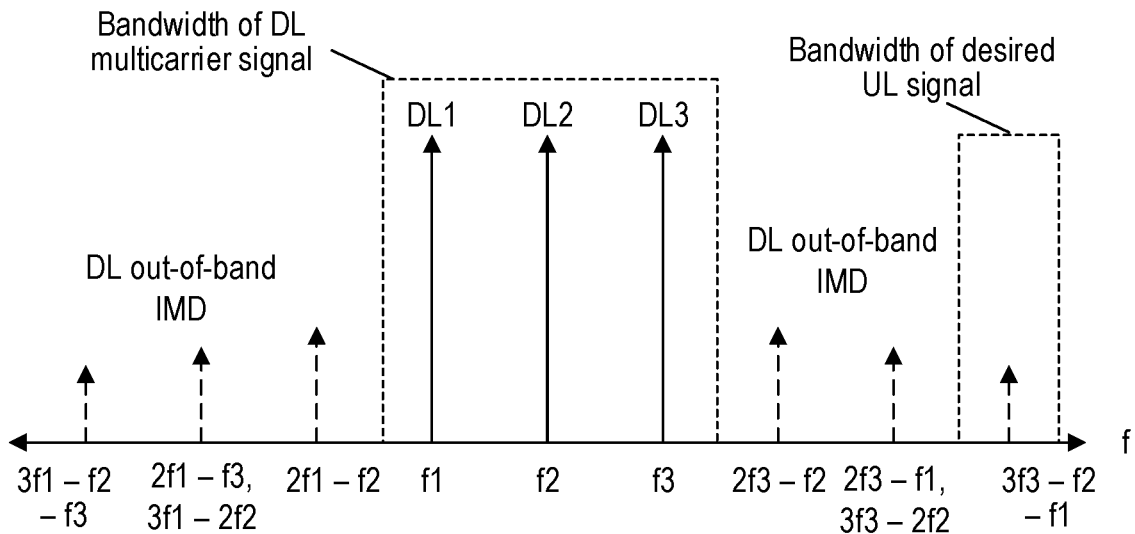
FIG. 5 shows an exemplary frequency spectrum of a multi-carrier downlink (DL) signal, such as transmitted by a base station (e.g., gNB, eNB, en-gNB, ng-eNB, etc., or component thereof).

FIG. 5 shows an exemplary frequency spectrum of a multi-carrier downlink (DL) signal, such as transmitted by a base station (e.g., gNB, eNB, en-gNB, ng-eNB, etc., or component thereof). The multi-carrier DL signal shown in FIG. 5 includes three separate DL carriers, represented by respective vertical lines labelled DL1, DL2, and DL3. The respective DL carriers are located at center frequencies f1, f2, and f3. Although the individual frequency bandwidths of the DL carriers are not shown, the approximate total bandwidth of the DL multicarrier signal is indicated by a dashed line surrounding DL1, DL2, and DL3.

The multi-carrier DL signal comprising DL1, DL2, and DL3 can encounter various non-linearities prior to transmission via the base station antenna. For example, this can include non-linear behavior of active components used for signal generation and/or amplification, such as the power amplifier (PA) discussed briefly above. As another example, the multi-carrier signal can encounter non-linear behavior of passive components such as cables, etc.

As briefly discussed above, such non-linearities cause interaction (e.g., multiplication or "mixing") among the individual DL carriers comprising the multicarrier DL signal, which results in the generation of IMD components. These IMD components can be generated within and/or outside of the bandwidth ("out-of-band") of the DL multi-carrier signal. FIG. 5 shows various out-of-band DL IMD components. In general, these out-of-band components are located at frequencies $f_{IMD}=m \cdot fi+/-n \cdot fj+/-p \cdot fk$, where n, m, $p \in (0, \pm 1, \pm 2, \ldots )$; i, j, $k \in (1, 2, 3)$; and $i \neq j \neq k$. Furthermore, IMD components where $|n|+|m|=3$ (p=0) are generally referred to as "third-order IMD" (or "third-order IM products"). Similarly, terms where $|n|+|m|+|p|=5$ are generally referred to as "fifth-order IMD" (or "fifth-order IM products"). For the sake of clarity, only third- and fifth-order IMD are shown in FIG. 5.

Figure 2A:
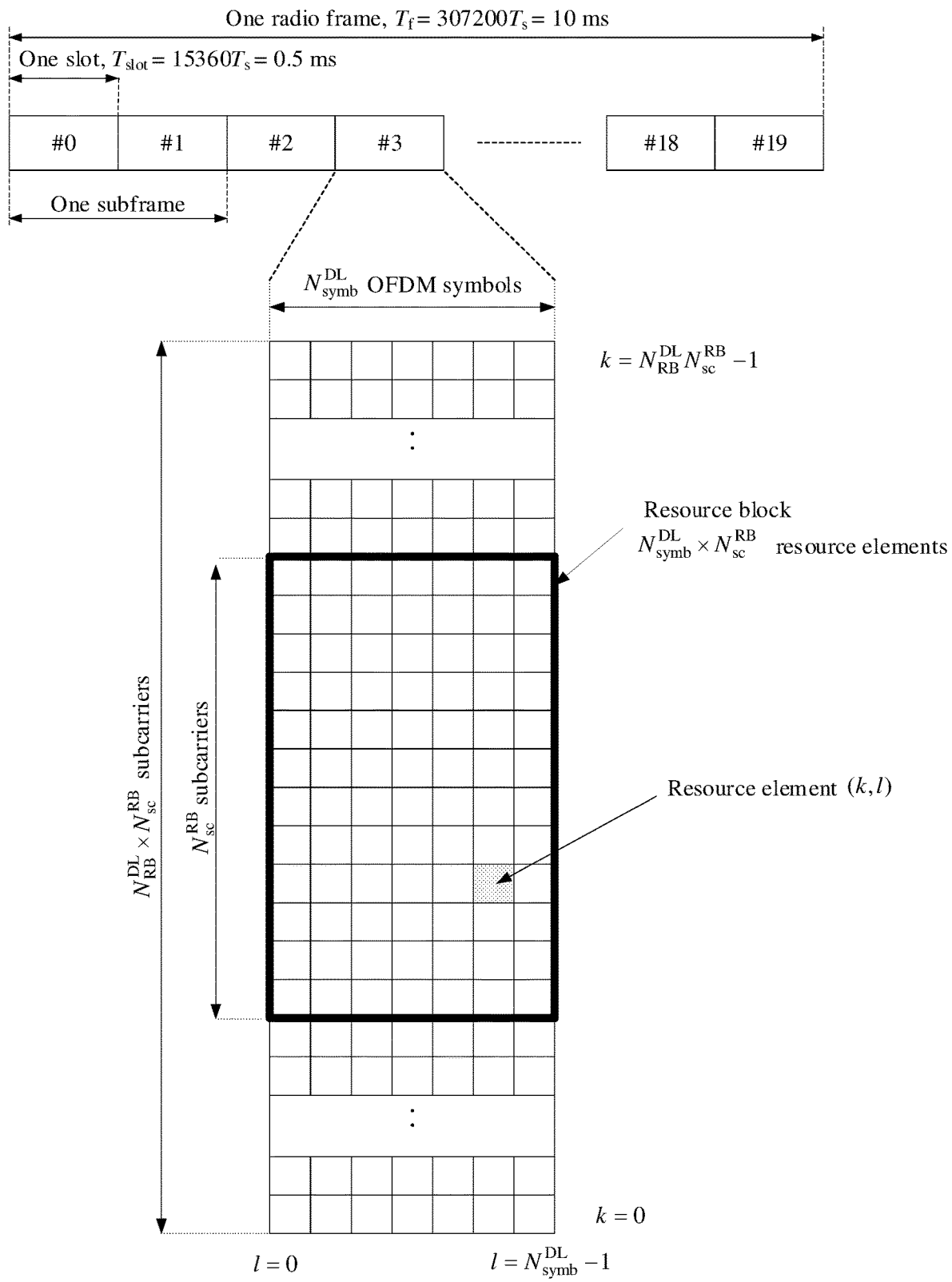
FIGS. 2A and 2B are block diagrams, respectively, of exemplary downlink (DL) and uplink (UL) LTE radio frame structures used for frequency division duplexing (FDD) operation.
Figure 2B:
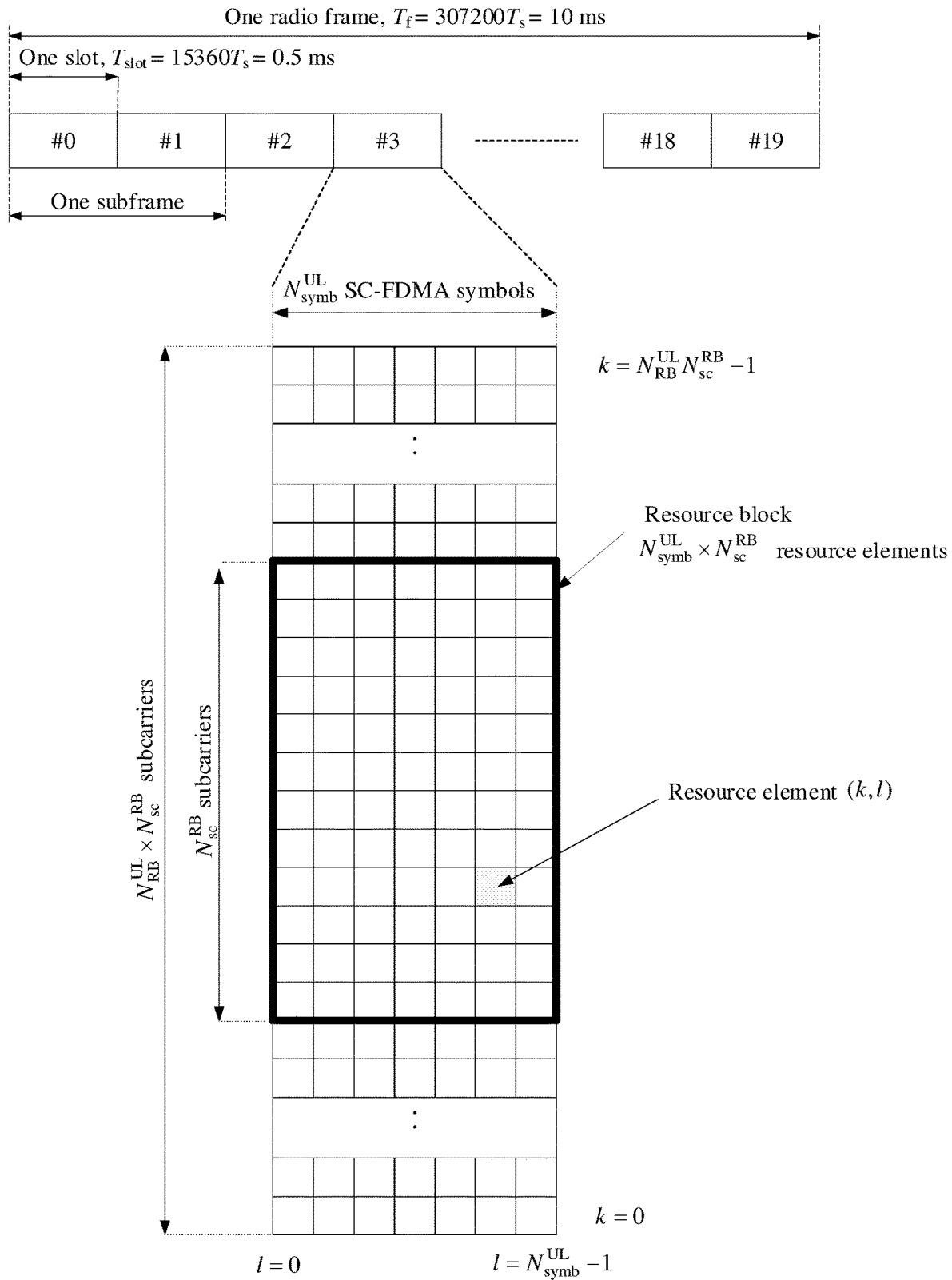
Figure 3:
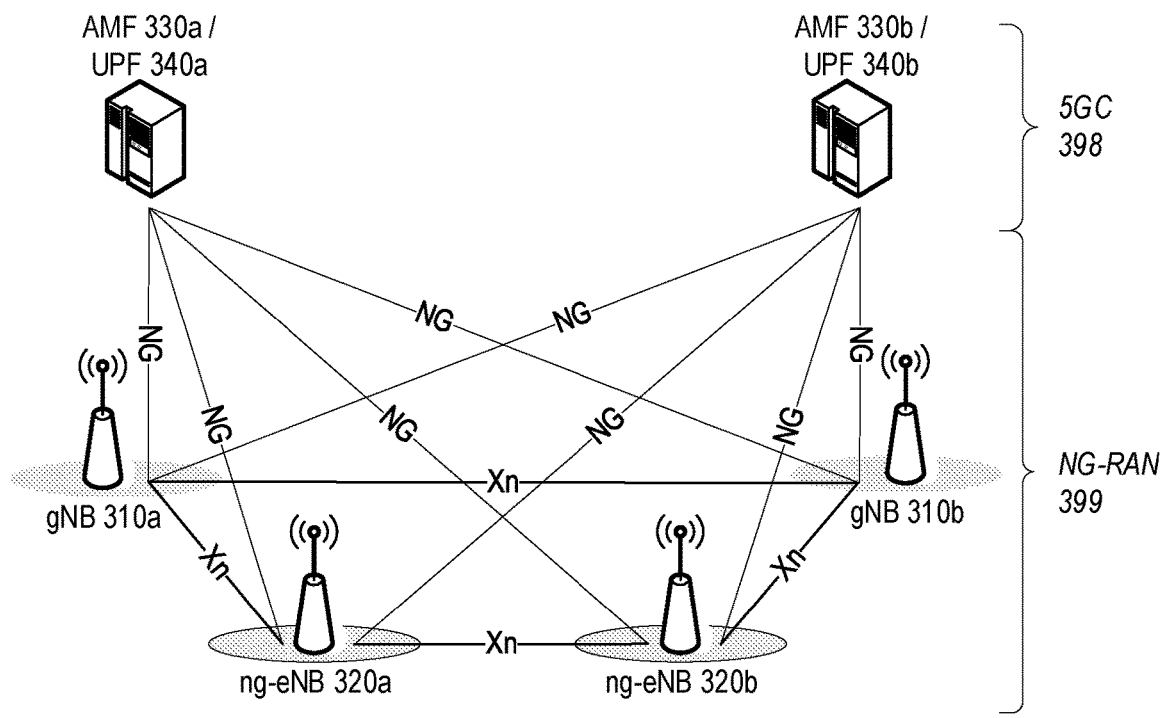
FIG. 3 illustrates a high-level view of an exemplary 5G network architecture.
Figure 4:
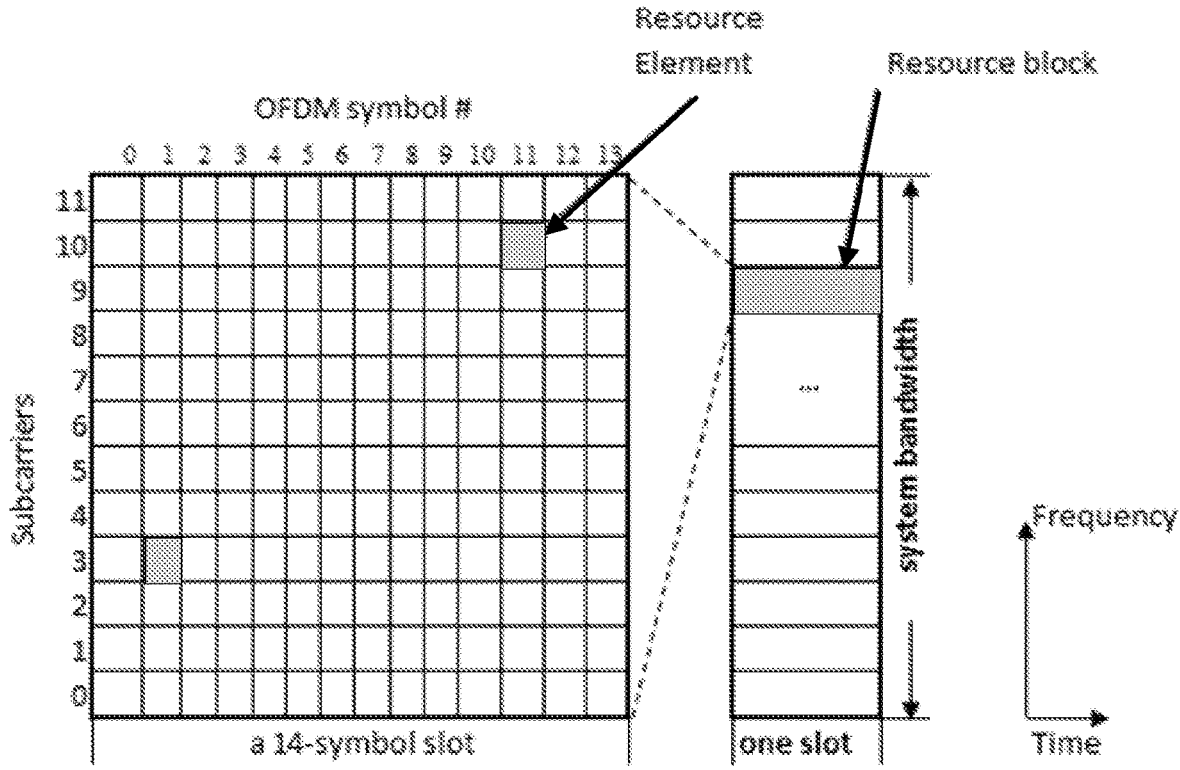
FIG. 4 shows an exemplary time-frequency resource grid for an NR slot.

In addition, FIG. 5 shows a frequency bandwidth of a desired UL signal, such as an UL signal that includes signals and/or channels transmitted by one or more UEs. For example, the UL signal can be a single UL carrier that includes a plurality of subcarriers, such as illustrated in FIGS. 2 and 4 discussed above, with the various signals and/or channels mapped to the plurality of subcarriers. In addition, FIG. 5 shows that one of the DL IMD components occurs at frequency 3·f3−f2−f1, which falls within the frequency bandwidth of the desired UL signal. Since it occurs within this frequency bandwidth, the base station cannot filter out this IMD component and it will interfere with the desired UL signal.

Figure 6:
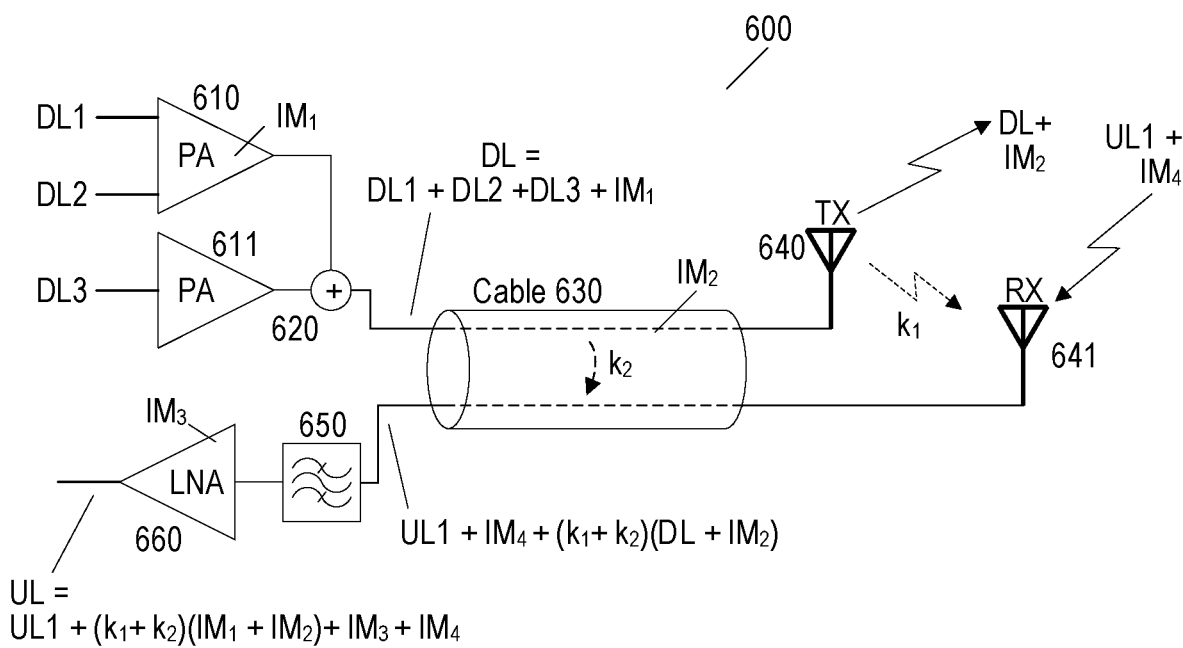
FIG. 6 shows an exemplary high-level base station architecture that illustrates various ways in which DL multi-carrier intermodulation distortion (IMD) can interfere with a desired UL signal.

FIG. 6 shows an exemplary high-level base station architecture 600 that illustrates various ways in which DL multi-carrier IMD can interfere with a desired UL signal. Similar to FIG. 5, the DL multicarrier signal comprises three DL carriers, labelled DL1, DL2, and DL3. Carriers DL1 and DL2 are input to PA 610, which amplifies the two carriers and also generates IMD labelled $IM_1$. Carrier DL3 is input to PA 611, and the amplified output is combined (e.g., in combiner 620) with the output of PA 610, resulting in composite DL signal DL=DL1+DL2+DL3+$IM_1$. This signal is passed through cable 630 to transmit (TX) antenna 640. Cable 630 can include various non-linearities that can generate additional IMD among the various components of DL, which is labelled $IM_2$ in FIG. 6. As such, the signal transmitted via antenna 640 includes the composite DL signal and $IM_2$.

In alternate arrangements, not shown in FIG. 6, the two outputs from PAs 610-611 can be sent separately (e.g., on different conductors) through cable 630 and then combined prior to transmission via antenna 640. Put a different way, combiner 620 can be located on the opposite end of cable 630. In such arrangements, the non-linear behavior of cable 630 still exists and can result in $IM_2$ among the various DL components.

The base station 600 also includes receive (RX) antenna 641, which is used to receive desired UL signals from UEs, including signal UL1 as shown. For example, UL1 can be located in the bandwidth, shown in FIG. 5, that also includes the IMD signal located at 3f3-f2-f1. Since they are both associated with base station 600, RX antenna 641 and TX antenna 640 are proximate to each other. Due to this proximity, RX antenna 641 will receive an attenuated version of the signal transmitted via antenna 640, represented in FIG. 6 by attenuation factor $k_1$. In some scenarios, RX antenna 641 can also receive IMD from a source external to the antenna, such as other equipment that is part of, proximate to, and/or associated with base station 600. This external IMD source is labeled $IM_4$ in FIG. 6.

The signal received by antenna 641 is passed through cable 630 to the base station's receiver circuitry. Due to the physical proximity to composite signal DL in cable 630, as well as various practical limitations and/or imperfections in cable 630, the received signal UL1 can also pick up an attenuated version of the composite DL signal and the cable-generated IMD $IM_2$ while traversing cable 630. This is often referred to as "crosstalk" and is represented in FIG. 6 by attenuation factor $k_2$.

At the receiver unit, the composite signal exiting the cable is represented by UL1+$IM_4$+($k_1$+$k_2$)(DL+$IM_2$). This signal is passed through a preselect filter, which significantly attenuates signals outside of the base station receiver's UL frequency range. As such, filter 650 will significantly attenuate the DL carriers that are present at the filter input, i.e., ($k_1$+$k_2$)(DL1+DL2+DL3). Even so, the power levels of the DL carriers can be much larger than the desired UL1 signal at the filter input. Since these DL carriers may not be strictly confined within a bandwidth such as shown in FIG. 5, a portion of their energy may fall within the bandwidth of the desired UL signal, which will pass through the filter 650.

After being filtered by preselect filter 650, the resulting signal will be amplified by a low-noise amplifier (LNA) 660. Similar to PAs 610-611, LNA 660 can also exhibit non-linear behavior. As such, LNA 660 can generate additional IMD based on the interaction of the various signal and IMD components that pass through filter 650. This is labelled $IM_3$ in FIG. 6. The composite UL signal output from LNA 660 comprises UL1+($k_1$+$k_2$)($IM_1$+$IM_2$)+$IM_3$+$IM_4$, where UL1 is the desired UL signal (e.g., signals and/or channels transmitted by one or more UEs) received via RX antenna 641. The remainder of the composite UL signal is interference that—depending on the level or amount—can degrade, reduce, and/or inhibit the base station's ability to receive the desired UL signal, UL1.

Figure 7:
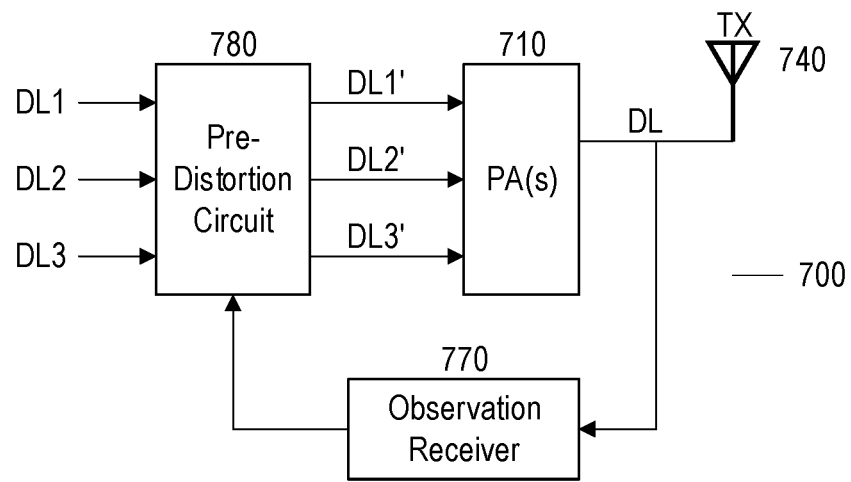
FIGS. 7-8 show two exemplary base station architectures that use conventional techniques for estimating and mitigating multi-carrier IMD.

One problem to be solved is detecting, estimating, and/or modeling the amount of distortion that is generated by the various non-linear behaviors, which then can be accepted as reasonable or can be removed, mitigated, and/or compensated. FIG. 7 shows an exemplary base station transmitter 700 that uses a conventional technique for estimating and mitigating multi-carrier IMD. In transmitter 700, the DL signals DL1, DL2, and DL3 are provided to a pre-distortion circuit 780, which generates modified DL signals DL1', DL2', and DL3'. Initially, circuit 780 may simply pass through the DL signals without modification. The outputs of circuit 780 are input to one or more PA(s) 710, such as the two-PA arrangement shown in FIG. 6. The signals are amplified by the PA(s) and provided to antenna 740, where they are transmitted.

The output(s) of PA(s) 710 are also monitored and/or observed by an observation receiver 770, which feeds back information representative of the composite DL into predistortion circuit 780. Based on this feedback and the non-distorted input signals DL1, DL2, and DL3, the predistortion circuit 780 can estimate the non-linear distortions to the respective input signals DL1, DL2, and DL3. For example, circuit 780 can estimate the function $f_{IQ}$ that is the input-output relationship the DL signals and the distortion, which is given by:

$$\gamma_{NL,sym1} = f_{IQ}(x_{DL1,sym1}, x_{DL2,sym1}, x_{DL3,sym1} \cdots),$$

where the x and y variables correspond to blocks of time-domain samples (e.g., I/Q data).

Based on this estimation, the predistortion circuit 780 can an inverse function to be applied to each of the DL signals to compensate for the subsequent non-linear distortion generated by PA(s) 710. Put more simply, circuit 780 "pre-distorts" signals DL1, DL2, and DL3 into respective signals DL1', DL2', and DL3', which cause PA(s) 710 to generate a smaller amount of IMD than for original signals DL1, DL2, and DL3.

Figure 8:
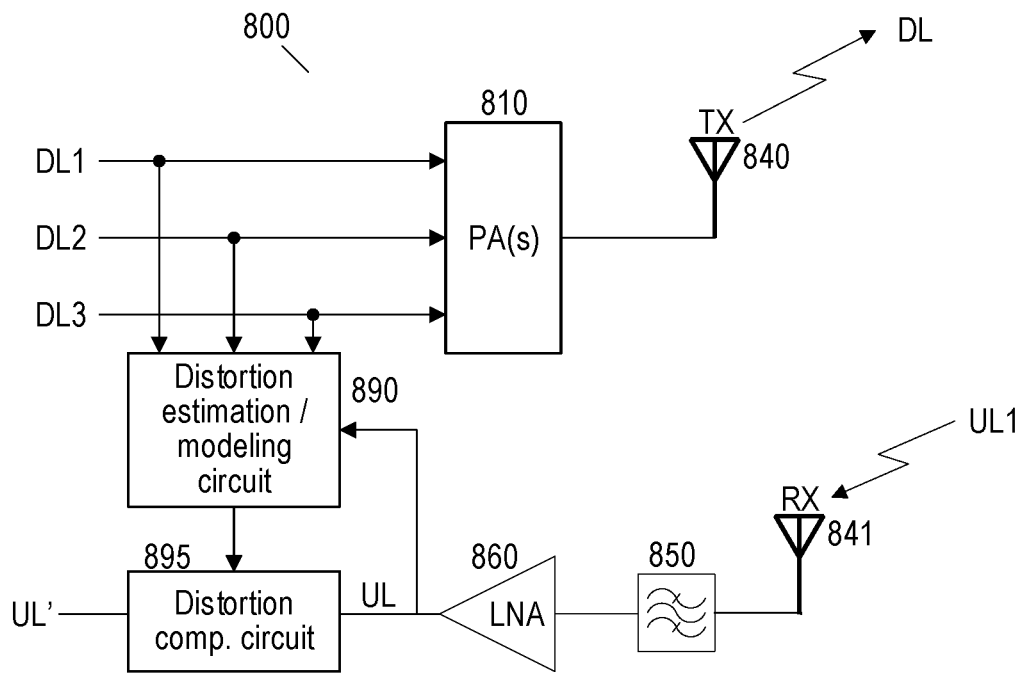

FIG. 8 shows an exemplary base station transmitter/receiver 800 that uses another conventional technique for estimating and mitigating multi-carrier IMD. Two differences from the arrangement shown in FIG. 7 are apparent. First, rather than using an observation receiver to monitor the PA outputs, the arrangement shown in FIG. 8 monitors the composite UL signal output from the LNA 860. This UL signal includes the desired UL1 signal as well as various IMD components, as discussed above with reference to FIG. 6. The LNA output signal UL (or information derived therefrom) is input together with the DL signals DL1, DL2, and DL3 into a distortion estimation circuit 890, which can estimate the non-linear distortion present in UL in a similar manner as predistortion circuit 780 described above.

Second, the arrangement shown in FIG. 8 does not "pre-distort" the DL signals DL1, DL2, and DL3 based on the estimated non-linear distortion. Rather, the output of the distortion estimation circuit 890 is input to a distortion compensation circuit 895, which uses this information to determine how to compensate for, mitigate, reduce, and/or remove the estimated distortion from the UL signal. The output of circuit 895 is compensated signal UL'.

Although the conventional techniques illustrated in FIGS. 7-8 can have some success in mitigating multi-carrier IMD, they also suffer from various drawbacks, issues, and/or problems. Generally, these techniques operate on time-domain samples of the respective signals, whereby they sample the respective signals, determine distortions in the respective samples, apply compensation, and then generate the time-domain samples of the compensated signals. This requires sampling and processing at high rates, which is very complex and consumes a significant amount of energy. These issues are exacerbated by increasing IMD orders (e.g., fifth, seventh, etc.), which require corresponding increase in sampling and processing rates. The sampling and processing complexity can also increase due to "memory effects" whereby the PA's non-linear behavior is a function of operating temperature, frequency, etc.

In addition, time-domain sampling and processing requires relatively strict time alignment between the multiple DL carriers. This can place additional requirements on the sampling infrastructure and/or require additional processing to time-align the sampled signals.

Furthermore, such conventional techniques can be inadequate when the non-linear behavior is dynamic. For example, such techniques exhibit a fundamental trade-off between having sensitivity for detecting non-linear distortion that is weak (e.g., relative to the desired UE signals and other environmental interference) and adaptability for handling changes in the non-linear behavior. In general, good sensitivity is often chosen at the expense of fast dynamics handling. As such, conventional solutions can often over- or under-estimate the amount of distortion during dynamic changes.

In addition, such conventional techniques also have difficulty distinguishing the UE UL data carried by the desired UL signals from the non-linear distortion. For example, the relatively random UE data carried in the desired UL signals is effectively a dynamic noise source that impedes the ability to estimate and/or model the non-linear behavior.

Exemplary embodiments of the present disclosure can address these and other issues, problems, and/or difficulties by providing novel techniques for modeling non-linear behavior in a multi-carrier scenario that can cause intermodulation distortion (IMD) that affects receiver performance Such techniques can model the relationship between the average power of DL signals and the corresponding average IMD power in the UL signal, due to the non-linear behavior. For example, such modeling can be based on a processed measurement or statistic (e.g., average power or other statistics that employ an average) rather than an instantaneous value (e.g., signal amplitude or power) that must be sampled at a relatively high rate.

More specifically, exemplary embodiments can utilize a "difference model" rather than the direct input/output model and/or estimation used by conventional techniques. To give an illustrative example, in the LTE 1-ms subframe shown in FIG. 2, the average UE traffic power level does not significantly change across the 14 OFDM symbols of the subframe. This is also generally true for other portions of the UL signal, including intercell interference and thermal noise in the radio receiver. If the average power is measured over the duration of a symbol, the difference in average power measured for two (2) symbols within the same LTE subframe is primarily due to the portion of the UL power difference that is coming from any IMD (also referred to below as "non-linear distortion") that is present.

If the non-linear distortion power differs between two symbols, this implies that the power of the DL signal that generates the distortion also differs during those same two symbols. In the DL, the per-symbol average power varies across a 1-msec subframe due to location of reference signals (e.g., CRS, CSI-RS, DM-RS, etc.) as well as the type of channels carried in the signals, such as control channels (e.g., PDCCH) vs. data channels (e.g., PDSCH).

According to various embodiments, the base station (e.g., a processing unit and/or measuring unit in the base station) can collect a plurality (e.g., two or more) of average power measurements for the offending DL signals and the victim UL signal. Each of the measurements can be over a symbol duration. As an example, the offending DL signals are DL1, DL2, and DL3, whereas the victim UL signal is simply designated as "UL." The collected values for two measurements would comprise:

$P_{UL,sym1}$, $P_{UL,sym2}$, $P_{DL1,sym1}$, $P_{DL1,sym2}$, $P_{DL2,sym1}$, $P_{DL2,sym2}$, $P_{DL3,sym1}$, $P_{DL3,sym2}$ ...

Subsequently, the base station can determine a difference between the average power in the two UL measurements, such as:

$$\Delta P_{UL} = P_{UL,sym1} - P_{UL,sym2}$$

The base station can then use the above information to determine a "difference power" model for the non-linear distortion. This determination can include fitting the various average power measurements to model parameter hypotheses to determine an optimum and/or preferred set of model parameters. The model is represented by $f_{\Delta p}$, which is a difference between a function, $f_p$, evaluated for two symbols. The resulting difference power $\Delta P_{NL}$ can be expressed as:

$$\Delta P_{NL} = f_{\Delta P}(P_{DL1,sym1}, P_{DL1,sym2}, P_{DL2,sym1}, P_{DL2,sym2}, P_{DL3,sym1}, P_{DL3,sym2}, \ldots) = f_P(P_{DL1,sym1}, P_{DL2,sym1}, P_{DL3,sym1}, \ldots) - f_P(P_{DL1,sym2}, P_{DL2,sym2}, P_{DL3,sym2}, \ldots)$$

Although an estimate of $P_{NL}$ itself is not available, exemplary embodiments of the novel techniques disclosed herein determine an estimate of the difference, $\Delta P_{NL}$, between the non-linear distortion power present in two symbols. This estimate of $\Delta P_{NL}$ results from the choice of symbols such that $\Delta P_{NL} \approx \Delta P_{UL}$. The model $f_p(\ )$ its parameters (e.g., determined from the fitting) and DL power measurements can then be used to estimate the distortion power in the UL channel.

Such exemplary embodiments provide various advantages, benefits, and/or improvements compared to conventional techniques. For example, such embodiments can handle dynamic of non-linear behavior without sacrificing sensitivity. Whereas conventional techniques require non-linear behavior to remain static over duration that is long enough to capture enough data to satisfy sensitivity, exemplary embodiments only require non-linear behavior to remain static over the duration of two average power measurements, e.g., two adjacent LTE symbols in the same radio sub-frame.

As another example, the complexity of exemplary embodiments is low compared to conventional techniques, since they merely require power calculations and parameter fitting to a difference model. Furthermore, the complexity of exemplary embodiments does not depend on distortion order. The non-linear terms themselves are not generated, so there is no need to up-sample signals to high rates to avoid aliasing.

As another example, exemplary embodiments can exhibit robust performance in the presence of normal UL traffic, e.g., from UEs. Such UE traffic does not result in a dynamic noise source that degrades the performance of the non-linear modeling, as in conventional techniques. Instead the difference in average UE power between the two measurements (e.g., two LTE symbols in the same radio sub-frame) is the noise term. The difference can be significantly smaller than the actual UE traffic. Also, since exemplary embodiments can operate normally in the presence of normal UE traffic, they do not require training data as do some conventional techniques.

As yet another example, exemplary embodiments can exhibit robust performance in the presence of phase noise and frequency/time alignment errors. In fact, exemplary embodiments do not require any knowledge of the frequencies of the carriers, and the average power measurements/calculations are not impacted by phase.

As another example, exemplary embodiments do not require time-domain sampling and processing. The per-symbol power measurements can be calculated from subcarriers in frequency domain. Furthermore, in some embodiments, UE traffic in the UL can be removed in the frequency domain, giving cleaner UL measurements for the algorithm.

Although various embodiments are described in terms of a "base station", unless specifically stated to the contrary, such embodiments can also be implemented in components of a base station, such as a radio unit, a baseband unit, a transceiver unit, a processing unit, a central unit (CU), a distributed unit (DU), a remote unit, etc. Furthermore, various operations and/or features comprising such embodiments can be distributed across such units and, if necessary and/or desired, performed remotely from the base station itself, so long as the needed information is available from the L1 PHY and the radio. Moreover, embodiments are not strictly limited to base stations, and can also be performed by a user equipment (e.g., for multi-carrier UL interference with a received DL signal) so long as the needed information and processing circuitry are available.

Figure 9A:
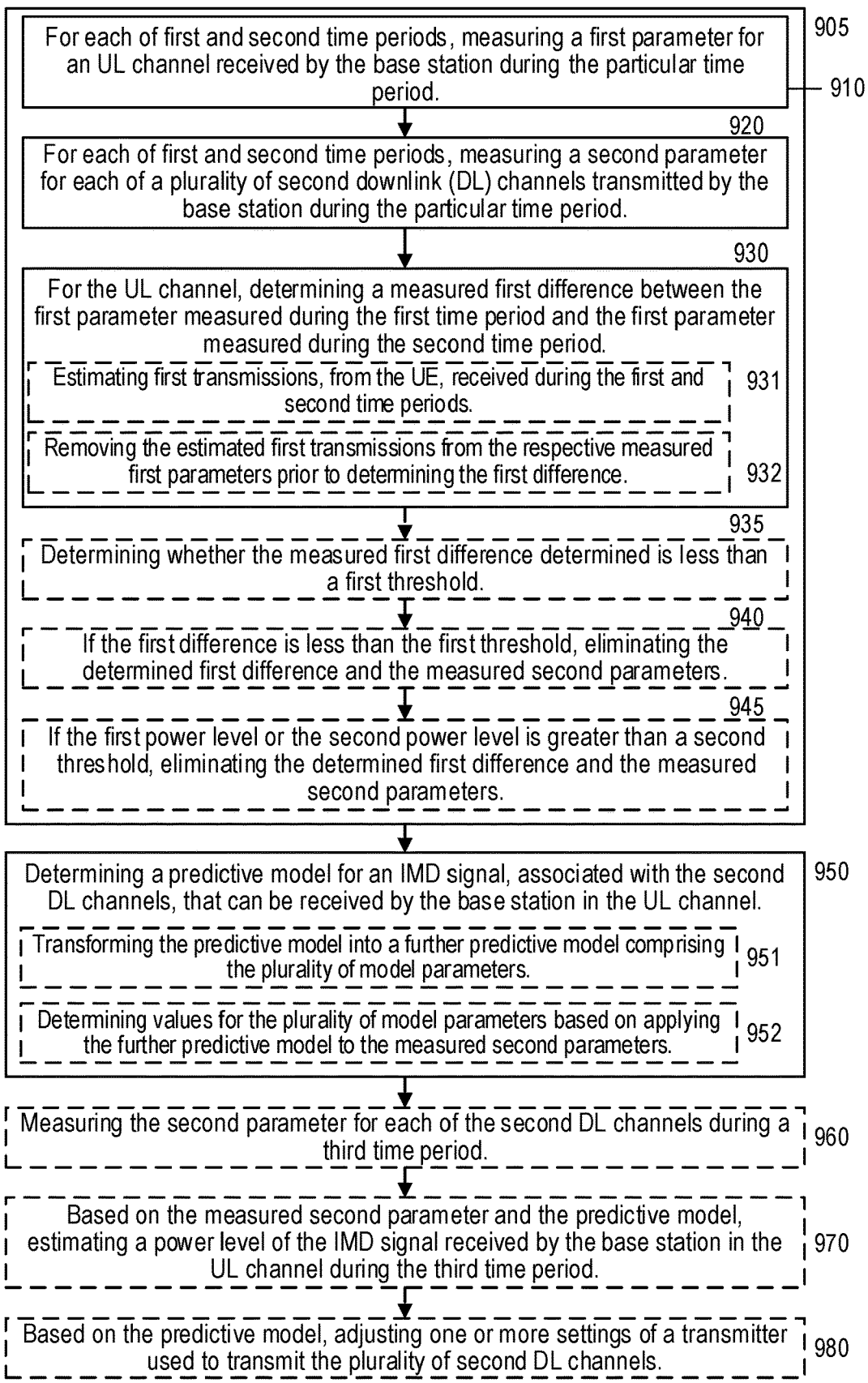
FIGS. 9A and 9B, shows a flow diagram of an exemplary method and/or procedure for a network node (e.g., base station, gNB, eNB, en-gNB, ng-eNB, etc., or component thereof), according to various exemplary embodiments of the present disclosure.
Figure 9B:
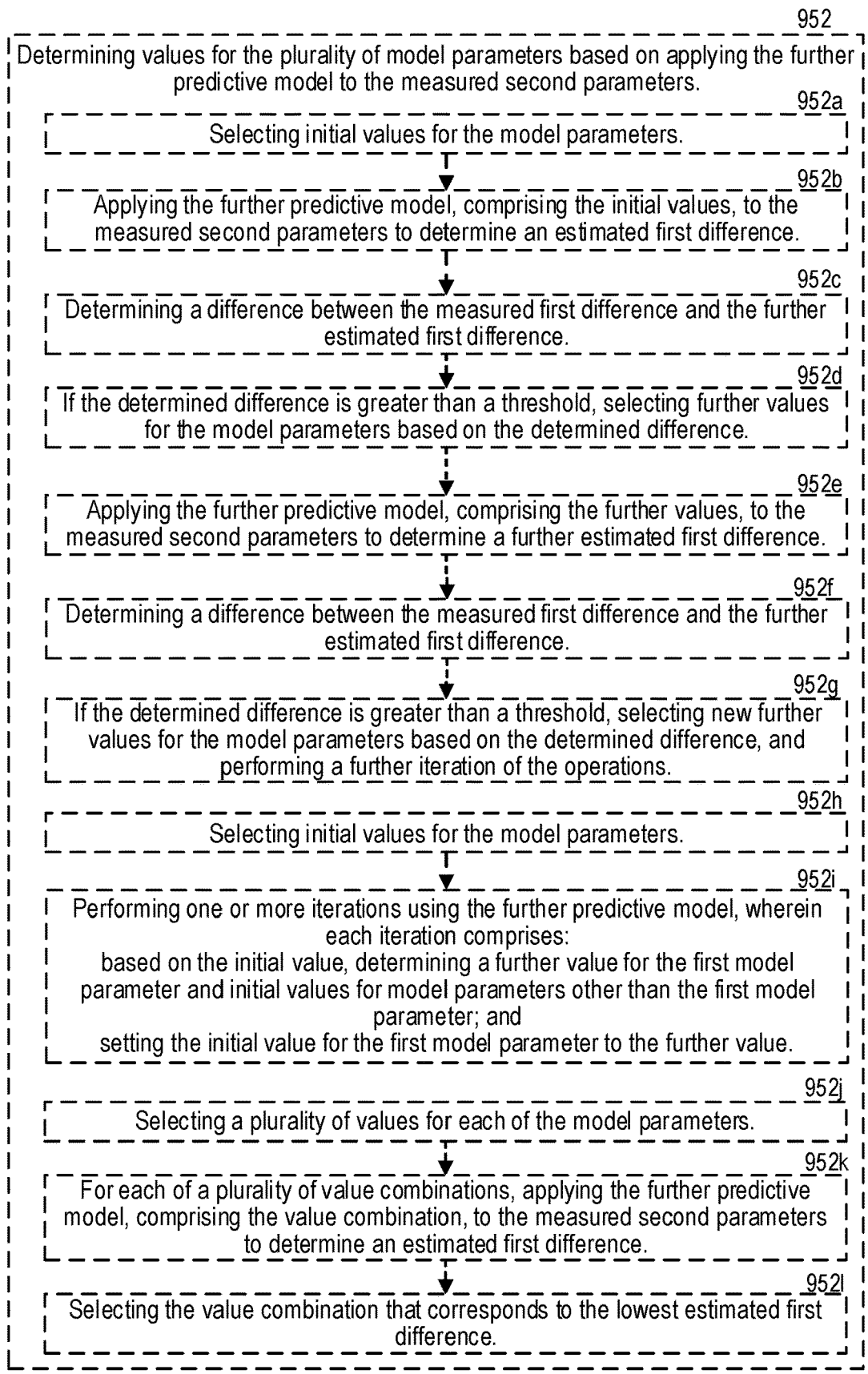

FIG. 9 (which includes FIGS. 9A-B) shows a flow diagram of an exemplary method and/or procedure for determining intermodulation distortion (IMD) present in an uplink (UL) channel received by a base station in a wireless communication network, according to various exemplary embodiments of the present disclosure. The exemplary method and/or procedure can be performed by a network node (e.g., base station, eNB, gNB, en-gNB, ng-eNB, etc., or component thereof) in a wireless communication network, such as a radio access network (RAN). For example, the exemplary method and/or procedure shown in FIG. 9 can be implemented in a base station or network node configured in various ways described herein, such as with reference to other figures. Furthermore, the exemplary method and/or procedure shown in FIG. 9 can be utilized cooperatively with other exemplary methods and/or procedures described herein to provide various exemplary benefits and/or advantages. Although FIG. 9 shows blocks in a particular order, this order is merely exemplary, and the operations of the exemplary method and/or procedure can be performed in a different order than shown in FIG. 9 and can be combined and/or divided into blocks having different functionality. Optional blocks or operations are shown by dashed lines.

The exemplary method and/or procedure illustrated in FIG. 9 can include the operations of block 905, where the network node can perform various operations with respect to each of a plurality of time-period pairs. Each time-period pair comprises a first time period and a second time period. For example, the first and second time periods can be the durations of two OFDM symbols in a subframe of a radio frame, such as described above in relation to other figures.

In some embodiments, the first and second time periods comprising each time-period pair can be consecutive, e.g., without any substantial intervening time period. In some embodiments, the first and second time periods can be consecutive symbols in one slot.

The various operations are shown in blocks 910, 920, 930, 935, 940, and 945, which are described in more detail below. Where not explicitly stated, it should be understood that the described operations are performed with respect to each time-period pair.

The exemplary method and/or procedure can include the operations of block 910, where for each of the first and second time periods, the network node can measure a first parameter for an UL channel received by the base station during that particular time period. The UL channel can include one or more carriers. For example, the measured first parameter can be average received (UL) power during the respective time periods (e.g., during two successive OFDM symbols). For example, for each time-period pair, the UL channel can carry a first transmission from a UE at a first average power level during the first time period, and a second transmission from the UE at a second average power level during the second time period. In some embodiments, the first and second time periods can be selected (e.g., based on expected UE traffic) such that the first and second power levels can be substantially identical.

The exemplary method and/or procedure can include the operations of block 920, where for each of the first and second time periods, the network node can measure a second parameter for each of a plurality of second downlink (DL) channels transmitted by the base station during that particular time period. For example, the network node can measure average transmitted power for each of a plurality of DL channels during the respective time periods (e.g., during two successive OFDM symbols). Each of the DL channels can include one or more carriers.

The plurality of second DL channels can be selected in various ways. As one example, the plurality of second DL channels can be all DL channels that are in the same conducted transmission line (e.g., cable 630) as the measured UL channel. As another example, the plurality of second DL channels can be the DL channels that are amplified by the same power amplifier (e.g., DL1 and DL2 in FIG. 6). As another example, the plurality of second DL channels can be all DL channels that can be received by the base station antenna together the UL channel (e.g., the leakage factor k1 shown in FIG. 6).

In addition, the corresponding measurements of the first parameter of the UL channel and the second parameters of the DL channels should be time-aligned as best as possible to ensure the non-linear distortion in the UL measurement was caused by the same DL signals captured in the measurements of the second parameters.

The exemplary method and/or procedure can include the operations of block 930, where the network node can determine, for the UL channel, a measured first difference between the first parameter measured during the first time period and the first parameter measured during the second time period. For example, the network node can determine a difference between average UL power measured on two successive OFDM symbols, which was denoted above as $\Delta P_{UL}$.

In some embodiments, the operations of block 930 can include the operations of sub-block 931, where the network node can estimate first transmissions received from the UE during the first and second time periods. In such embodiments, the operations of block 930 can include the operations of sub-block 932, where the network node can remove the estimated first transmissions from the respective measured first parameters prior to determining the measured first difference. As such, the network node can remove the effects of the desired UL signal, thereby improving the ability to determine a module for the non-linear behavior that introduces IMD.

In some embodiments, the exemplary method and/or procedure can also include the operations of block 935, where the network node can determine whether the measured first difference determined is less than a first threshold. In such embodiments, the exemplary method and/or procedure can include the operations of block 940, where the network node can, if the first difference is less than the first threshold, eliminate the determined first difference and the measured second parameters for that particular time-period pair from the determination of the predictive model. As such, the network node can filter the measured/determined information based on certain criteria. For example, the network node can eliminate measurements in a subframe where there is not enough difference in the DL statistic over the pair of measurements.

In some embodiments, the exemplary method and/or procedure can also include the operations of block 945, where the network node can, if the first power level or the second power level is greater than a second threshold, eliminate the determined first difference and the measured second parameters for that particular time-period pair from the determination of the predictive model. For example, the network node can eliminate measurements in a subframe where the UE traffic, in one or both of the measurements, is much stronger than the IMD. In this manner, the network node can reduce the impact of UE traffic on the determination of the non-linear distortion model.

The exemplary method and/or procedure can also include the operations of block 950, where the network node can determine a predictive model for an IMD signal, associated with the second DL channels, that can be received by the base station in the UL channel. This determination can be based on the measured first difference and the measured second parameters for the respective time-period pairs. For example, the predictive model can be a non-linear model relating the first parameter and the second parameters.

In some embodiments, the predictive model can be for an IMD signal, associated with the second DL channels, that is transmitted by the base station into a wireless transmission medium, and that can be received by the base station via an antenna. In other embodiments, the predictive model can be for an IMD signal, associated with the second DL channels, that is transmitted by the base station into a wired transmission medium, and that can be received by the base station via the wired transmission medium. For example, the wired transmission medium can be a cable.

Furthermore, the predictive model can include a plurality of model parameters. In some embodiments, the operations of block 950 can include the operations of sub-block 951, where the network node can transform the predictive model into a further predictive model comprising the plurality of model parameters. In such embodiments, the operations of block 950 can also include the operations of sub-block 952, where the network node can determine values for the plurality of model parameters based on applying the further predictive model to the measured second parameters. In some embodiments, the further predictive model can be a further non-linear model relating the determined first difference and the measured second parameters.

Various parameter-based predictive models are described below. However, these are given only for the purpose of explanation and illustration, and are not intended to limit the scope of the present disclosure in any way. As one example, the non-linear model can be:

$$P_{UL} = c_0(P_{DL1}{}^{c_1} + P_{DL2}{}^{c_2} + \ldots),$$

where $c_0$ and $c_1$ are the model parameters; $P_{UL}$ is a measured first parameter (e.g., UL average power for a particular time period, in Watts); $P_{DL1}$, $P_{DL2}$ are measured second parameters (e.g., DL average power for the particular time period). When transforming this model to a difference model for first and second time periods tp1 and tp2, $P_{UL,tp1}$, $P_{UL,tp2}$ are the respective measured first parameters; $\Delta P_{DL} = P_{UL,tp1} - P_{UL,tp2}$ is the determined first difference; and $P_{DLi,tp1}$ and $P_{DLi,tp2}$ are the measured second parameters for DL carriers i=1 . . . N. In such case, the further non-linear model can be expressed as:

using the same notation as in the previous example. In such case, the further non-linear model can be expressed as:

$$\log \Delta P_{UL} = \log c_0 + c_1 \log(P_{DL1,tp1} + P_{DL2,tp1} + \ldots) + \\ \log\left[1 - \frac{(P_{DL1,tp2} + P_{DL2,tp2} + \ldots)^{c_1}}{(P_{DL1,tp1} + P_{DL2,tp1} + \ldots)^{c_1}}\right].$$

As mentioned above, the measurements during the first and second time periods can correspond to two OFDM symbols within the same subframe. In some embodiments, the symbols can be consecutive. Within an LTE subframe, the average power transmitted by a UE in the UL is assumed to be substantially constant for two symbols in the same subframe. Other non-IMD components of the received UL signal—such as receiver noise, interference from UEs in other cells, etc.—are also assumed to be substantially constant for the two symbols in the same subframe. As such, the difference between the contributions of these components to average UL power $P_{UL}$ is expected to be approximately zero. Accordingly, $\Delta P_{UL} \approx \Delta P_{IMD}$, the difference between average IMD power during the first and second time periods. This difference in IMD power is related, of course, to the difference between the IMD sources during the respective time periods, i.e., the average powers of the DL signals which are measured as the second parameters.

In various embodiments, the operations of block 952 (determining values for the model parameters) can be performed in various ways, and can include various combinations of operations in sub-blocks 952a-952l shown in FIG. 9B. In some embodiments, the operations of block 952 can include the operations of sub-block 952a, where the network node can select initial values for the model parameters. Such embodiments can also include the operations of sub-block 952b, where the network node can apply the further predictive model, comprising the initial values, to the measured second parameters to determine an estimated first difference. Such embodiments can also include the operations of sub-block 952c, where the network node can determine a difference between the measured first difference and the further estimated first difference. Such embodiments can also include the operations of sub-block 952d, where the network node can, if the determined difference is greater than a threshold, select further values for the model parameters based on the determined difference.

In some embodiments, the operations of block 952 can include the operations of sub-block 952e, where the network node can apply the further predictive model, comprising the further values, to the measured second parameters to determine a further estimated first difference. Such embodiments can also include the operations of sub-block 952f, where the network node can determine a difference between the measured first difference and the further estimated first difference. Such embodiments can also include the operations of sub-block 952g, where the network node can if the determined difference is greater than a threshold, select new further values for the model parameters based on the determined difference, and perform a further iteration of the operations. For example, the further iteration can include operations in sub-blocks 952e-g. In this manner, the network node can iteratively determine some optimum and/or preferred values for the model parameters.

In other embodiments, the operations of block 952 can also include the operations of sub-block 952h, where the network node can select an initial value for a first model parameter, and block 952i, where the network node can perform one or more iterations using the further predictive model. In various embodiments, the one or more iterations can include: based on the initial value, determining a further value for the first model parameter and initial values for model parameters other than the first model parameter; and setting the initial value for the first model parameter to the further value.

In other embodiments, the operations of block 952 can include the operations of sub-block 952j, where the network node can select a plurality of values for each of the model parameters. In such embodiments, the operations of block 952 can also include the operations of sub-block 952k, where the network node can, for each of a plurality of value combinations, apply the further predictive model, comprising the value combination, to the measured second parameters to determine an estimated first difference. Each value combination can include one selected value for each of the model parameters. In such embodiments, the operations of block 952 can also include the operations of sub-block 952l, where the network node can select the value combination that corresponds to the lowest estimated first difference. In this manner, the network node can sweep through combinations of parameter values, thereby determining some optimum and/or preferred values for the model parameters.

Once the model parameters are determined in the operations of block 950, the network node can use them in various ways. Returning to FIG. 9A, in some embodiments, the exemplary method and/or procedure can also include the operations of block 960, where the network node can measure the second parameter for each of the second DL channels during a third time period. For example, the third time period can be during a subframe that is subsequent to the subframe(s) comprising the first and second time periods. The third time period can include one or more symbols.

In such embodiments, the exemplary method and/or procedure can also include the operations of block 970, where the network node can, based on the measured second parameter and the predictive model, estimate a power level of the IMD signal received by the network node in the UL channel during the third time period. In other words, the network node can use the previously-determined predictive model to predict the power level of a subsequently-occurring IMD signal that interferes with the desired UL signal. Furthermore, the network node can use the predicted power level to determine if it should take any further actions during the third time period (and/or thereafter) with respect to IMD mitigating and/or compensation.

In some embodiments, the exemplary method and/or procedure can also include the operations of block 980, where the network node can, based on the predictive model, adjust one or more settings of a transmitter used to transmit the plurality of second DL channels. For example, based on the model predicting non-linear distortion, the network node can apply pre-distortion to the second DL channels in the manner described above with reference to FIG. 7.

Figure 13:
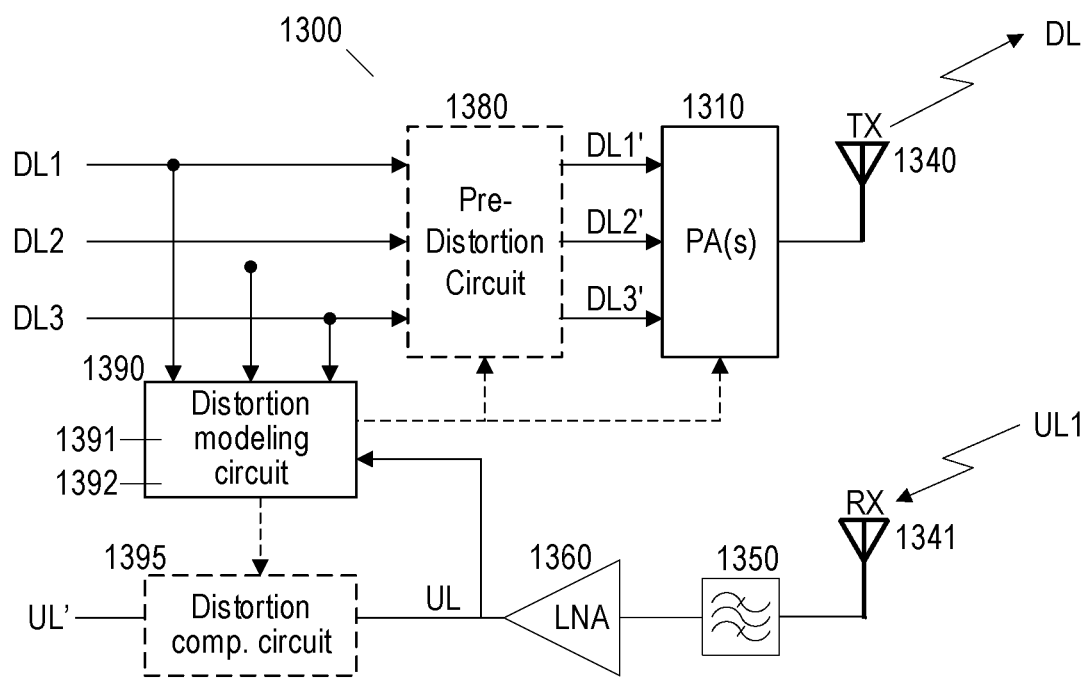
FIG. 13 shows an exemplary apparatus according to various exemplary embodiments of the present disclosure.

FIG. 13 shows an exemplary apparatus 1300 that can perform operations corresponding to the various exemplary methods and/or procedures described above with reference to FIG. 9. For example, the exemplary apparatus 1300 can be part of a network node or base station. Many of the components of apparatus 1300 can be substantially similar to components described above with reference to FIGS. 6-7, so similar reference numbers are used in FIG. 13. For example, PA(s) 1310 amplify multiple DL channels and/or carriers that are provided as a composite DL signal to antenna 1340 for transmission. In addition, antenna 1341 receives a desired UL signal, UL1, that is passed through preselect filter 1350 before being amplified by LNA 1360 to produce an output signal UL, which can include one or more IMD components resulting from the non-linear distortion of the composite DL signal.

The received UL signal and the respective DL signals (e.g., DL1, DL2, and DL3) are input to a distortion modeling circuit 1390, which can include various processing circuitry 1391 and, measurement circuitry (1392). This circuitry can be collectively configured to determine intermodulation distortion (IMD) present in in the UL signal received by apparatus 1300, such as by the exemplary methods and/or procedures for modeling the IMD described above. The IMD modeled by circuit 1390 can be used in various ways, described below.

In some embodiments, the output of circuit 1390 can be used to adjust one or more settings of a transmitter used to transmit the plurality of second DL channels. For example, the modeled IMD can be used to adjust a power and/or backoff setting of the PA(s) 1310, e.g., to change the amount of IMD generated.

In some embodiments, apparatus 1300 can also include pre-distortion circuitry 1380, which can be similar to pre-distortion circuit 780. Circuit 1380 can "pre-distort" signals DL1, DL2, and DL3 into respective signals DL1', DL2', and DL3' based on the modeled IMD, which can cause PA(s) 1310 to generate a smaller amount of IMD than for original signals DL1, DL2, and DL3.

In other embodiments, apparatus 1300 can also include distortion compensation circuit 1395, which can be similar to distortion compensation circuit 895. Circuit 1395 can use the output of the distortion modeling circuit 1390 is to determine how to compensate for, mitigate, reduce, and/or remove the estimated distortion from the UL signal, resulting in modified signal UL'.

Although various embodiments are described herein above in terms of methods, apparatus, devices, computer-readable media, etc. the person of ordinary skill will readily comprehend that such methods can be embodied by various combinations of hardware and software in various systems, communication devices, computing devices, control devices, apparatuses, non-transitory computer-readable media, etc.

Figure 10:
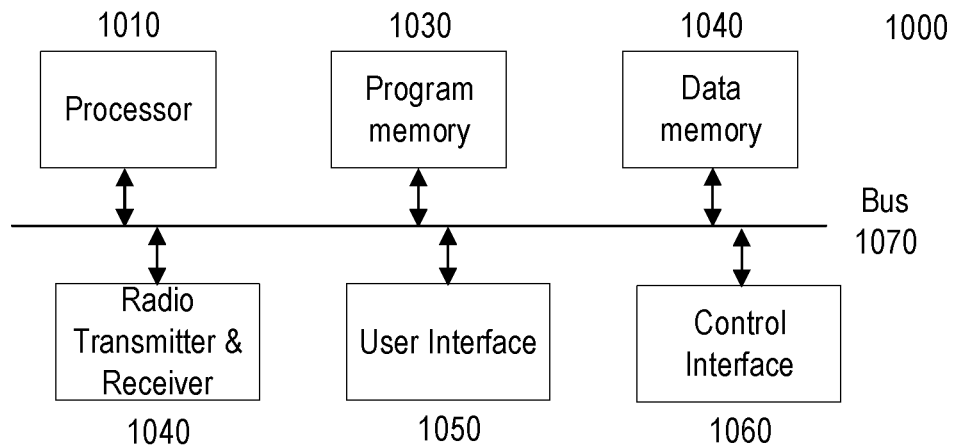
FIG. 10 is a block diagram of an exemplary wireless device or UE according to various exemplary embodiments of the present disclosure.

FIG. 10 shows a block diagram of an exemplary wireless device or user equipment (UE) 1000 according to various embodiments of the present disclosure. For example, exemplary device 1000 can be configured by execution of instructions, stored on a computer-readable medium, to perform operations corresponding to one or more of the exemplary methods and/or procedures described above.

Exemplary device 1000 can comprise a processor 1010 that can be operably connected to a program memory 1020 and/or a data memory 1030 via a bus 1070 that can comprise parallel address and data buses, serial ports, or other methods and/or structures known to those of ordinary skill in the art. Program memory 1020 comprises software code or program executed by processor 1010 that facilitates, causes and/or programs exemplary device 1000 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 1002.11 WiFi, HDMI, USB, Firewire, etc., or any other current or future protocols that can be utilized in conjunction with radio transceiver 1040, user interface 1050, and/or host interface 1060.

For example, processor 1010 can execute program code stored in program memory 1020 that corresponds to MAC, RLC, PDCP, and RRC layer protocols standardized by 3GPP (e.g., for NR and/or LTE). As a further example, processor 1010 can execute program code stored in program memory 1020 that, together with radio transceiver 1040, implements corresponding PHY layer protocols, such as Orthogonal Frequency Division Multiplexing (OFDM), Cyclic Prefix OFDM (CP-OFDM), Orthogonal Frequency Division Multiple Access (OFDMA), Single-Carrier Frequency Division Multiple Access (SC-FDMA), DFT-spread OFDM (DFT-S-OFDM), etc.

Program memory 1020 can also comprises software code executed by processor 1010 to control the functions of device 1000, including configuring and controlling various components such as radio transceiver 1040, user interface 1050, and/or host interface 1060. Program memory 1020 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1020 can comprise an external storage arrangement (not shown) remote from device 1000, from which the instructions can be downloaded into program memory 1020 located within or removably coupled to device 1000, so as to enable execution of such instructions.

Data memory 1030 can comprise memory area for processor 1010 to store variables used in protocols, configuration, control, and other functions of device 1000, including operations corresponding to, or comprising, any of the exemplary methods and/or procedures described herein. Moreover, program memory 1020 and/or data memory 1030 can comprise non-volatile memory (e.g., flash memory), volatile memory (e.g., static or dynamic RAM), or a combination thereof. Furthermore, data memory 1030 can comprise a memory slot by which removable memory cards in one or more formats (e.g., SD Card, Memory Stick, Compact Flash, etc.) can be inserted and removed. Persons of ordinary skill in the art will recognize that processor 1010 can comprise multiple individual processors (including, e.g., multi-core processors), each of which implements a portion of the functionality described above. In such cases, multiple individual processors can be commonly connected to program memory 1020 and data memory 1030 or individually connected to multiple individual program memories and or data memories. More generally, persons of ordinary skill in the art will recognize that various protocols and other functions of device 1000 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A radio transceiver 1040 can comprise radio-frequency transmitter and/or receiver functionality that facilitates the device 1000 to communicate with other equipment supporting like wireless communication standards and/or protocols. In some exemplary embodiments, the radio transceiver 1040 includes a transmitter and a receiver that enable device 1000 to communicate with various 5G/NR networks according to various protocols and/or methods proposed for standardization by 3GPP and/or other standards bodies. For example, such functionality can operate cooperatively with processor 1010 to implement a PHY layer based on OFDM, CP-OFDM, DFT-S-OFDM, OFDMA, and/or SC-FDMA technologies, such as described herein with respect to other figures.

In some exemplary embodiments, the radio transceiver 1040 includes an LTE transmitter and receiver that can facilitate the device 1000 to communicate with various LTE, LTE-Advanced (LTE-A), and/or LTE License Assisted Access (LAA) networks according to standards promulgated by 3GPP. In some exemplary embodiments, the radio transceiver 1040 includes an NR transmitter and receiver that can facilitate the device 1000 to communicate with various NR networks according to standards promulgated by 3GPP. In some exemplary embodiments of the present disclosure, the radio transceiver 1040 includes circuitry, firmware, etc. necessary for the device 1000 to communicate with various NR, LTE, LTE-A, LTE-LAA, UMTS, and/or GSM/EDGE networks, also according to 3GPP standards. In some exemplary embodiments of the present disclosure, radio transceiver 1040 includes circuitry, firmware, etc. necessary for the device 1000 to communicate with various CDMA2000 networks, according to 3GPP2 standards.

In some exemplary embodiments of the present disclosure, the radio transceiver 1040 is capable of communicating using radio technologies that operate in unlicensed frequency bands, such as IEEE 1002.11 WiFi that operates using frequencies in the regions of 2.4, 5.6, and/or 60 GHz. In some exemplary embodiments of the present disclosure, radio transceiver 1040 can comprise a transceiver that is capable of wired communication, such as by using IEEE 802.3 Ethernet technology. The functionality particular to each of these embodiments can be coupled with or controlled by other circuitry in the device 1000, such as the processor 1010 executing program code stored in program memory 1020 in conjunction with, or supported by, data memory 1030.

User interface 1050 can take various forms depending on the particular embodiment of device 1000, or can be absent from device 1000 entirely. In some exemplary embodiments, user interface 1050 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the device 1000 can comprise a tablet computing device including a larger touchscreen display. In such embodiments, one or more of the mechanical features of the user interface 1050 can be replaced by comparable or functionally equivalent virtual user interface features (e.g., virtual keypad, virtual buttons, etc.) implemented using the touchscreen display, as familiar to persons of ordinary skill in the art. In other embodiments, the device 1000 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the device 1000 having a touch screen display are capable of receiving user inputs, such as inputs related to exemplary methods and/or procedures described herein or otherwise known to persons of ordinary skill in the art.

In some exemplary embodiments of the present disclosure, device 1000 can comprise an orientation sensor, which can be used in various ways by features and functions of device 1000. For example, the device 1000 can use outputs of the orientation sensor to determine when a user has changed the physical orientation of the device 1000's touch screen display. An indication signal from the orientation sensor can be available to any application program executing on the device 1000, such that an application program can change the orientation of a screen display (e.g., from portrait to landscape) automatically when the indication signal indicates an approximate 100-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1060 of the device 1000 can take various forms depending on the particular exemplary embodiment of device 1000 and of the particular interface requirements of other devices that the device 1000 is intended to communicate with and/or control. For example, the control interface 1060 can comprise an RS-232 interface, an RS-4105 interface, a USB interface, an HDMI interface, a Bluetooth interface, an IEEE ("Firewire") interface, an I²C interface, a PCMCIA interface, or the like. In some exemplary embodiments of the present disclosure, control interface 1060 can comprise an IEEE 1002.3 Ethernet interface such as described above. In some exemplary embodiments of the present disclosure, the control interface 1060 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 1000 can comprise more functionality than is shown in FIG. 10 including, for example, a video and/or still-image camera, microphone, media player and/or recorder, etc. Moreover, radio transceiver 1040 can include circuitry necessary to communicate using additional radio-frequency communication standards including Bluetooth, GPS, and/or others. Moreover, the processor 1010 can execute software code stored in the program memory 1020 to control such additional functionality. For example, directional velocity and/or position estimates output from a GPS receiver can be available to any application program executing on the device 1000, including various exemplary methods and/or computer-readable media according to various exemplary embodiments of the present disclosure.

Figure 11:
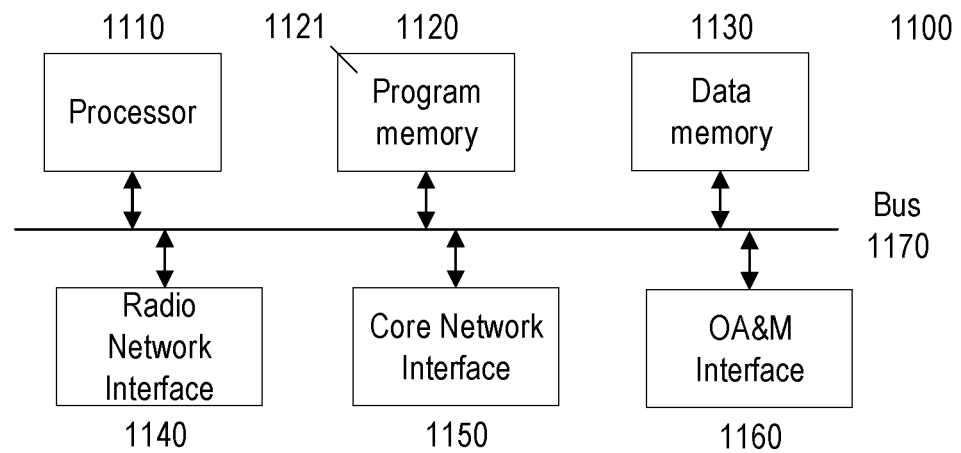
FIG. 11 is a block diagram of an exemplary network node according to various exemplary embodiments of the present disclosure.

FIG. 11 shows a block diagram of an exemplary network node 1100 according to various embodiments of the present disclosure. For example, exemplary network node 1100 can be configured by execution of instructions, stored on a computer-readable medium, to perform operations corresponding to one or more of the exemplary methods and/or procedures described above. In some exemplary embodiments, network node 1100 can comprise a base station, eNB, gNB, or one or more components thereof. For example, network node 1100 can be configured as a central unit (CU) and one or more distributed units (DUs) according to NR gNB architectures specified by 3GPP. More generally, the functionally of network node 1100 can be distributed across various physical devices, functional units, modules, etc.

Network node 1100 comprises processor 1110 which is operably connected to program memory 1120 and data memory 1130 via bus 1170, which can comprise parallel address and data buses, serial ports, or other methods and/or structures known to those of ordinary skill in the art. Program memory 1120 can include software code (e.g., computer-program product 1121) that, when executed by processor 1110, can configure and/or facilitate network node 1100 to perform operations corresponding to various exemplary methods and/or procedures described herein. The combination of processor 1110 with program memory 1120 and/or data memory 1130 can be referred to, in some cases, as "processing circuitry."

Program memory 1120 can also comprise software code executed by processor 1110 that can facilitate and specifically configure network node 1100 to communicate with one or more other devices using other protocols or protocol layers, such as one or more of the PHY, MAC, RLC, PDCP, and RRC layer protocols standardized by 3GPP for LTE, LTE-A, LTE-LAA, and/or NR, or any other higher-layer protocols utilized in conjunction with radio network interface 1140 and core network interface 1150. For example, core network interface 1150 can comprise and/or support the S1 interface and radio network interface 1150 can comprise and/or support the Uu interface, as standardized by 3GPP. Program memory 1120 can further comprise software code executed by processor 1110 to control the functions of network node 1100, including configuring and controlling various components such as radio network interface 1140 and core network interface 1150.

Data memory 1130 can comprise memory area for processor 1110 to store variables used in protocols, configuration, control, and other functions of network node 1100. As such, program memory 1120 and data memory 1130 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1110 can comprise multiple individual processors (not shown), each of which implements a portion of the functionality described above. In such case, multiple individual processors may be commonly connected to program memory 1120 and data memory 1130 or individually connected to multiple individual program memories and/or data memories. More generally, persons of ordinary skill in the art will recognize that various protocols and other functions of network node 1100 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1140 can comprise transmitters, receivers, signal processors, ASICs, antennas, beamforming units, and other circuitry that enables network node 1100 to communicate with other equipment such as, in some embodiments, a plurality of compatible user equipment (UE). In some exemplary embodiments, radio network interface can comprise various protocols or protocol layers, such as the PHY, MAC, RLC, PDCP, and RRC layer protocols standardized by 3GPP for LTE, LTE-A, LTE-LAA, NR, NR-U, etc.; improvements thereto such as described herein above; or any other higher-layer protocols utilized in conjunction with radio network interface 1140. According to further exemplary embodiments of the present disclosure, the radio network interface 1140 can comprise a PHY layer based on OFDM, CP-OFDM, DFT-S-OFDM, OFDMA, and/or SC-FDMA technologies. In some embodiments, the functionality of such a PHY layer can be provided cooperatively by radio network interface 1140 and processor 1110 (including program code in memory 1120).

For example, radio network interface 1140 can comprise some or all of the functionality shown in FIGS. 6-8, including one or more transmitter power amplifiers (PAs) and combiners, one or more receiver low-noise amplifiers (LNAs) and pre-select filters, antennas, etc. Radio network interface 1140 can also include components specifically configured for non-linear distortion estimation and mitigation. When coupled with the processing circuitry of the network node, such components can facilitate and/or enable the network node to perform operations corresponding to various exemplary methods and/or procedures described herein.

Core network interface 1150 can comprise transmitters, receivers, and other circuitry that enables network node 1100 to communicate with other equipment in a core network such as, in some embodiments, circuit-switched (CS) and/or packet-switched Core (PS) networks. In some embodiments, core network interface 1150 can comprise the S1 interface standardized by 3GPP. In some embodiments, core network interface 1150 can comprise the NG interface standardized by 3GPP. In some exemplary embodiments, core network interface 1150 can comprise one or more interfaces to one or more SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1150 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

OA&M interface 1160 can comprise transmitters, receivers, and other circuitry that enables network node 1100 to communicate with external networks, computers, databases, and the like for purposes of operations, administration, and maintenance of network node 1100 or other network equipment operably connected thereto. Lower layers of OA&M interface 1160 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1140, core network interface 1150, and OA&M interface 1160 may be multiplexed together on a single physical interface, such as the examples listed above.

Figure 12:
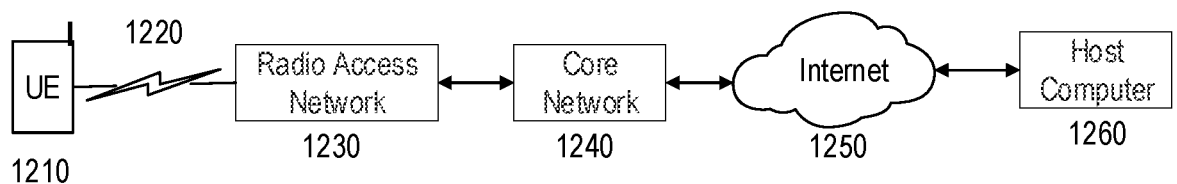
FIG. 12 is a block diagram of an exemplary network configured to provide over-the-top (OTT) data services between a host computer and a UE, according to various exemplary embodiments of the present disclosure.

FIG. 12 is a block diagram of an exemplary communication network configured to provide over-the-top (OTT) data services between a host computer and a user equipment (UE), according to one or more exemplary embodiments of the present disclosure. UE 1210 can communicate with radio access network (RAN) 1230 over radio interface 1220, which can be based on protocols described above including, e.g., LTE, LTE-A, and 5G/NR. For example, UE 1210 can be configured and/or arranged as shown in other figures discussed above. RAN 1230 can include one or more network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1230 can cooperatively operate using licensed and unlicensed spectrum.

Figure 1:
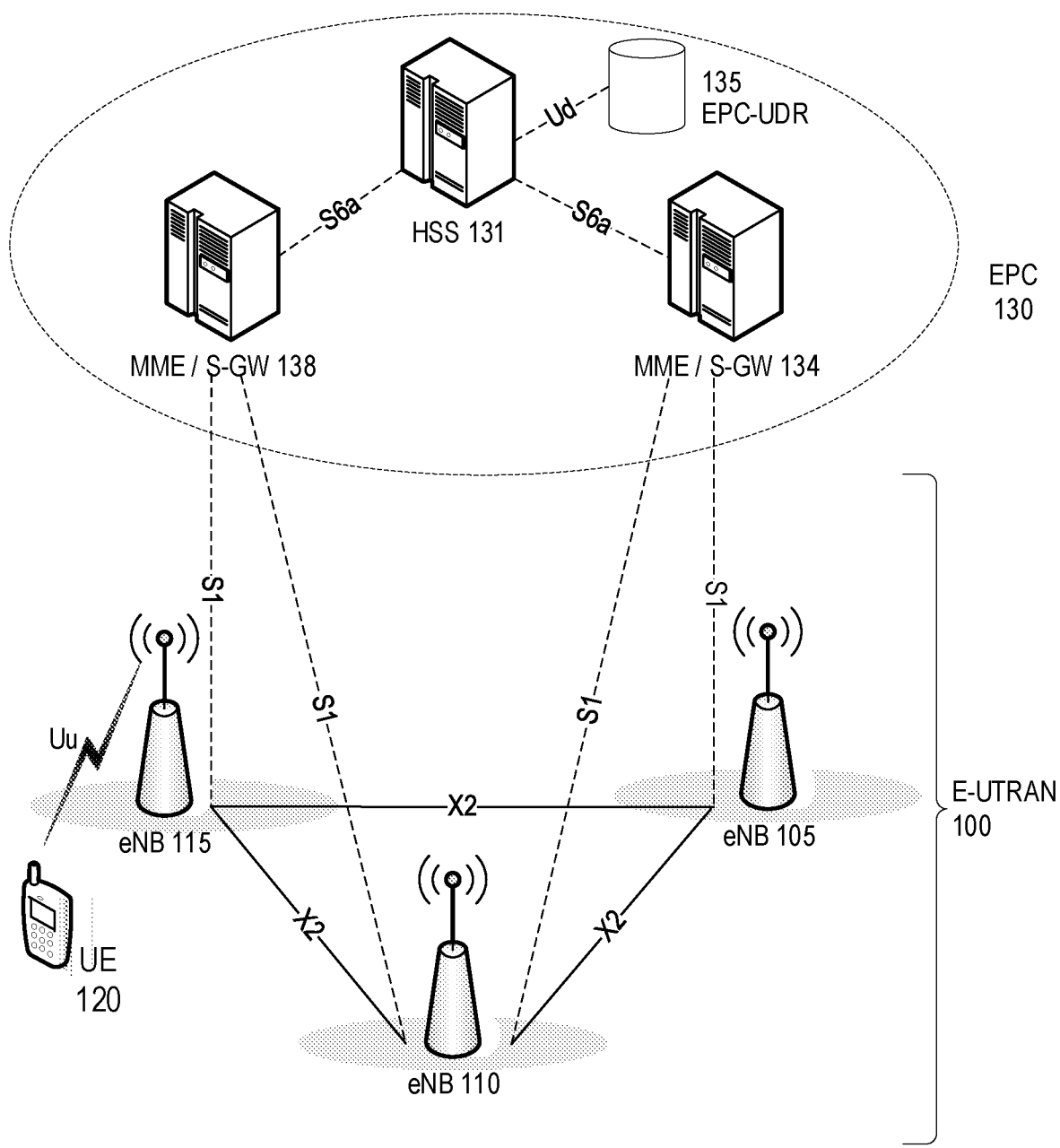
FIG. 1 is a high-level block diagram of an exemplary architecture of the Long-Term Evolution (LTE) Evolved UTRAN (E-UTRAN) and Evolved Packet Core (EPC) network, as standardized by 3GPP.

RAN 1230 can further communicate with core network 1240 according to various protocols and interfaces described above. For example, one or more apparatus (e.g., base stations, eNBs, gNBs, etc.) comprising RAN 1230 can communicate to core network 1240 via core network interface 1250 described above. In some exemplary embodiments, RAN 1230 and core network 1240 can be configured and/or arranged as shown in other figures discussed above. For example, eNBs comprising an E-UTRAN 1230 can communicate with an EPC core network 1240 via an S1 interface, such as shown in FIG. 1. As another example, gNBs comprising a NR RAN 1230 can communicate with a 5GC core network 1230 via an NG interface.

Core network 1240 can further communicate with an external packet data network, illustrated in FIG. 12 as Internet 1250, according to various protocols and interfaces known to persons of ordinary skill in the art. Many other devices and/or networks can also connect to and communicate via Internet 1250, such as exemplary host computer 1260. In some exemplary embodiments, host computer 1260 can communicate with UE 1210 using Internet 1250, core network 1240, and RAN 1230 as intermediaries. Host computer 1260 can be a server (e.g., an application server) under ownership and/or control of a service provider. Host computer 1260 can be operated by the OTT service provider or by another entity on the service provider's behalf.

For example, host computer 1260 can provide an over-the-top (OTT) packet data service to UE 1210 using facilities of core network 1240 and RAN 1230, which can be unaware of the routing of an outgoing/incoming communication to/from host computer 1260. Similarly, host computer 1260 can be unaware of routing of a transmission from the host computer to the UE, e.g., the routing of the transmission through RAN 1230. Various OTT services can be provided using the exemplary configuration shown in FIG. 12 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 12 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient techniques for transmitting and receiving downlink (DL) data messages comprising a plurality of transport blocks (TB) by configuring UEs (e.g., UE 1210) and network nodes (e.g., nodes in RAN 1230) to operate correctly and consistently in relation to a physical data channel (e.g., PDSCH) in a cell. By scaling and/or adjusting the LBRM threshold according to a function of the maximum number of DL transmission layers supported by the UE in the cell, such embodiments accommodate UE complexity and decoding constraints while minimizing and/or reducing network scheduler restrictions, especially when UE supports and is configured more than four DL transmission layers in the cell.

When used in NR UEs (e.g., UE 1210) and gNBs (e.g., gNBs comprising RAN 1230), exemplary embodiments described herein can provide various improvements, benefits, and/or advantages that facilitate data services (e.g., eMBB) used to deliver large amounts of data to a UE. As a consequence, this improves the performance of these services as experienced by OTT service providers and end-users, including more consistent data throughout and lower latency without excessive UE power consumption or other reductions in user experience.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The term "network node" used herein can be any kind of network node in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment.

As used herein, a "radio access node" (or "radio network node") can be any node in a radio access network (RAN) that operates to wirelessly transmit and/or receive signals. Some examples of radio access nodes include, but are not limited to, a base station (e.g., a New Radio (NR) base station (gNB) in a 3GPP Fifth Generation (5G) NR network or an eNB in a 3GPP LTE network), a high-power or macro base station, a low-power base station (e.g., a micro base station, a pico base station, a home eNB, or the like), a relay node, access point (AP), radio AP, remote radio unit (RRU), remote radio head (RRH), a multi-standard BS (e.g., MSR BS), multi-cell/multicast coordination entity (MCE), base transceiver station (BTS), base station controller (BSC), network controller, NodeB (NB), etc. Such terms can also be used to reference to components of a node, such as a gNB-CU and/or a gNB-DU.

As used herein, the term "radio node" can refer to a wireless device (WD) or a radio network node.

As used herein, a "core network node" can be any type of node in a core network. Some examples of a core network node include, e.g., a Mobility Management Entity (MME), a Packet Data Network Gateway (P-GW), a Service Capability Exposure Function (SCEF), Access and Mobility Management Function (AMF), User Plane Function (UPF), Home Subscriber Server (HSS), etc.

As used herein, a "network node" is any node that is part of a radio access network (e.g., a "radio network node" or "radio access node") or a core network (e.g., a "core network node") of a wireless communication system, such as a cellular communications network/system.

In some embodiments, the non-limiting terms "wireless device" (WD) or "user equipment" (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine-to-machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, the term "slot" is used to indicate a radio resource; however, it should be understood that the techniques described herein may advantageously be used with other types of radio resources, such as any type of physical resource or radio resource expressed in terms of length of time. Examples of time resources include symbol, time slot, minislot, subframe, radio frame, transmission time interval (TTI), interleaving time, a time resource number, etc.

In some embodiments, a transmitter (e.g., network node) and a receiver (e.g., WD) previously agrees on rule(s) for determining for which resources the transmitter and receiver will arrange one or more physical channels during transmission of the resources, and this rule may, in some embodiments, be referred to as "mapping." In other embodiments, the term "mapping" may have other meanings.

As used herein, a "channel" can be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel (e.g., PDSCH), in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction.

Furthermore, although the term "cell" is used herein, it should be understood that (particularly with respect to 5G NR) beams may be used instead of cells and, as such, concepts described herein apply equally to both cells and beams.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the concepts, principles, and/or embodiments described herein.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The invention claimed is:

1. A method for determining intermodulation distortion (IMD) present in an uplink (UL) channel received by a network node in a wireless communication network, the method comprising:
    for each of a plurality of time-period pairs comprising a first time period and a second time period, performing the following operations:
        for each of the first and second time periods, measuring a first parameter for an UL channel received by the network node during that particular time period;
        for each of the first and second time periods, measuring a second parameter for each of a plurality of second downlink (DL) channels transmitted by the network node during that particular time period; and
        for the UL channel, determining a measured first difference between the first parameter measured during the first time period and the first parameter measured during the second time period; and
    based on the measured first difference and the measured second parameters for the respective time-period pairs, determining a predictive model for an IMD signal, associated with the second DL channels, that can be received by the network node in the UL channel.

2. The method of claim 1, wherein the predictive model is a non-linear model relating to the first parameters and the second parameters.

3. The method of claim 1, further comprising, for each of the time-period pairs:
    determining whether the first difference determined for that particular time-period pair is less than a first threshold; and
    if the first difference is less than the first threshold, eliminating the determined first difference and the measured second parameters for that particular time-period pair from the determination of the predictive model.

4. The method of claim 1, wherein the predictive model comprises a plurality of model parameters, and determining the predictive model comprises:
    transforming the predictive model into a further predictive model comprising the plurality of model parameters; and
    determining values for the plurality of model parameters based on applying the further predictive model to the measured second parameters.

5. The method of claim 4, wherein determining values for the plurality of model parameters comprises:
    selecting initial values for the model parameters;
    applying the further predictive model, comprising the initial values, to the measured second parameters to determine an estimated first difference;
    determining a difference between the measured first difference and the further estimated first difference; and
    if the determined difference is greater than a threshold, selecting further values for the model parameters based on the determined difference.

6. The method of claim 5, wherein determining values for the plurality of model parameters further comprises the following operations:
    applying the further predictive model, comprising the further values, to the measured second parameters to determine a further estimated first difference;
    determining a difference between the measured first difference and the further estimated first difference; and
    if the determined difference is greater than a threshold, selecting new further values for the model parameters based on the determined difference, and performing a further iteration of the operations.

7. The method of claim 4, wherein determining values for the plurality of model parameters comprises:
    selecting an initial value for a first model parameter; and
    performing one or more iterations using the further predictive model, wherein each iteration comprises:
        based on the initial value, determining a further value for the first model parameter and initial values for model parameters other than the first model parameter; and
        setting the initial value for the first model parameter to the further value.

8. The method of claim 4, wherein determining values for the plurality of model parameters comprises
    selecting a plurality of values for each of the model parameters;
    for each of a plurality of value combinations, each value combination comprising one selected value for each of the model parameters, applying the further predictive model, comprising the value combination, to the measured second parameters to determine an estimated first difference; and selecting the value combination that corresponds to the lowest estimated first difference.

9. The method of claim 4, wherein the further predictive model is a further non-linear model relating the determined first difference and the measured second parameters.

10. The method of claim 9, wherein:
the non-linear model comprises $$P_{UL}=c_0(P_{DL1}{}^{c1}+P_{DL2}{}^{c2}+\ldots);$$

$P_{UL,tp1}$-$P_{UL,tp2}$ is the determined first difference;
$P_{DLi,tp1}$ and $P_{DLi,tp2}$ are the measured second parameters, during the first and second time periods respectively, for transmitted channel i;
$c_0$ and $c_1$ and $c_2$ are the model parameters; and
the further non-linear model comprises:

$$\Delta P_{UL}=c_0[(P_{DL1,tp1}{}^{c1}-P_{DL2,tp1}{}^{c2}+\ldots)+(P_{D1,tp2}{}^{c1}+P_{DL2,tp2}{}^{c2}+\ldots)].$$

11. The method of claim 9, wherein:
the non-linear model comprises $$P_{UL}=c_0(P_{DL1}+P_{DL2}\ldots)^{c1},$$

$P_{UL,tp1}$-$P_{UL,tp2}$ is the determined first difference;
$P_{DLi,tp1}$ and $P_{DLi,tp2}$ are the measured second parameters, during the first and second time periods respectively, for transmitted channel i;
$c_0$ and $c_1$ are the model parameters, wherein $c_1$ is the first model parameter; and
the further non-linear model comprises:

$$\log\Delta P_{UL} = \log c_0 + c_1\log(P_{DL1,tp1} + P_{DL2,tp1} + \ldots) + \log\left[1 - \frac{(P_{DL1,tp2} + P_{DL2,tp2} + \ldots)^{c_1}}{(P_{DL1,tp1} + P_{DL2,tp1} + \ldots)^{c_1}}\right].$$

12. The method of claim 1, wherein for each time-period pair, the UL channel carries a first transmission, from a user equipment (UE), at a first power level during the first time period and a second transmission, from the UE, at a second power level during the second time period.

13. The method of claim 12, wherein the first and second time periods are selected such that first and second power levels are substantially identical.

14. The method of claim 12, wherein determining the measured first difference comprises:
estimating the first transmissions, from the UE, received during the first and second time periods; and
removing the estimated first transmissions from the respective measured first parameters prior to determining the measured first difference.

15. The method of claim 1, wherein the first and second time periods comprising each time-period pair are consecutive.

16. The method of claim 1, wherein the first and second time periods comprise consecutive symbols in one slot.

17. The method of claim 1, wherein the first parameter comprises a received power for the UL channel during the respective time periods, and each second parameter comprises a transmitted power for the corresponding second DL channel during the respective time periods.

18. The method of claim 1, further comprising:
measuring the second parameter for each of the second DL channels during a third time period; and
based on the measured second parameter and the predictive model, estimating a power level of the IMD signal received by the network node in the UL channel during the third time period.

19. A distortion modeling circuit comprising:
measurement circuitry configured to perform measurements on one or more uplink (UL) channels and a plurality of downlink (DL) channels; and
processing circuitry operably coupled to the measurement circuitry,
the combination of the processing circuitry the measurement circuitry being configured to perform a method for determining intermodulation distortion (IMD) present in an uplink (UL) channel received by a network node in a wireless communication network, the method comprising:
for each of a plurality of time-period pairs comprising a first time period and a second time period, performing the following operations:
for each of the first and second time periods, measuring a first parameter for an UL channel received by the network node during that particular time period;
for each of the first and second time periods, measuring a second parameter for each of a plurality of second downlink (DL) channels transmitted by the network node during that particular time period; and
for the UL channel, determining a measured first difference between the first parameter measured during the first time period and the first parameter measured during the second time period; and
based on the measured first difference and the measured second parameters for the respective time-period pairs, determining a predictive model for an IMD signal, associated with the second DL channels, that can be received by the network node in the UL channel.

20. A network node in a wireless communication network, the network node comprising:
a radio network interface configured to transmit and receive signals;
one or more processors operably coupled to the radio network interface;
and
one or more memories storing computer-executable instructions that, when executed by the one or more processors, configure the network node to perform a method for determining intermodulation distortion (IMD) present in an uplink (UL) channel received by a network node in a wireless communication network, the method comprising:
for each of a plurality of time-period pairs comprising a first time period and a second time period, performing the following operations:
for each of the first and second time periods, measuring a first parameter for an UL channel received by the network node during that particular time period;
for each of the first and second time periods, measuring a second parameter for each of a plurality of second downlink (DL) channels transmitted by the network node during that particular time period; and for the UL channel, determining a measured first difference between the first parameter measured during the first time period and the first parameter measured during the second time period; and based on the measured first difference and the measured second parameters for the respective time-period pairs, determining a predictive model for an IMD signal, associated with the second DL channels, that can be received by the network node in the UL channel.

\* \* \* \* \*